US012750886B2

(12) United States Patent
Chen et al.

(10) Patent No.: US 12,750,886 B2
(45) Date of Patent: Sep. 29, 2026

(54) COMBINATION OF CHANNEL ACCESS CONDITIONS

(71) Applicant: QUALCOMM Incorporated, San Diego, CA (US)

(72) Inventors: Siyi Chen, Beijing (CN); Arumugam Chendamarai Kannan, San Diego, CA (US); Changlong Xu, Beijing (CN); Jing Sun, San Diego, CA (US); Xiaoxia Zhang, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 18/257,430

(22) PCT Filed: Mar. 4, 2021

(86) PCT No.: PCT/CN2021/079041

§ 371 (c)(1),
(2) Date: Jun. 14, 2023

(87) PCT Pub. No.: WO2022/183425

PCT Pub. Date: Sep. 9, 2022

(65) Prior Publication Data

US 2024/0032106 A1 Jan. 25, 2024

(51) Int. Cl.

*H04W 4/00* (2018.01)
*H04W 74/0808* (2024.01)
*H04W 74/0833* (2024.01)

(52) U.S. Cl.

CPC ... *H04W 74/0833* (2013.01); *H04W 74/0808* (2013.01)

(58) Field of Classification Search

None

See application file for complete search history.

(56) References Cited

U.S. PATENT DOCUMENTS

2020/0022181 A1 1/2020 Li et al.
2020/0037292 A1* 1/2020 Oh ........................ H04W 72/23
(Continued)

FOREIGN PATENT DOCUMENTS

CN 109392104 A 2/2019
WO WO-2021062118 A1 * 4/2021 ........ H04W 74/0808

OTHER PUBLICATIONS

Huawei, et al., "Channel Access Mechanism for 60 GHz Unlicensed Operation", R1-2007605, 3GPP TSG RAN WG1 Meeting #103-e, E-meeting, Oct. 26-Nov. 13, 2020, Sections1, 3, 12 Pages.
(Continued)

*Primary Examiner* — Zewdu A Beyen
(74) *Attorney, Agent, or Firm* — Harrity & Harrity, LLP

(57) ABSTRACT

Wireless communications systems and methods related to channel access in a shared radio frequency band in an unlicensed spectrum or a shared spectrum are provided. A wireless communication device determines a channel access procedure based on whether one or more channel access conditions are satisfied for accessing an unlicensed frequency band. The one or more channel access conditions are associated with at least one of sensing across multiple channel occupancy times (COTs), a transmission beam characteristic, a transmit power, a transmission duty cycle, or a beam dwell time. The wireless communication device transmits, based on the channel access procedure, a communication signal in the unlicensed frequency band.

27 Claims, 15 Drawing Sheets

(56) References Cited

U.S. PATENT DOCUMENTS

| | | | | |
|---|---|---|---|---|
| 2020/0146064 | A1* | 5/2020 | Oh | H04W 74/0808 |
| 2021/0013954 | A1* | 1/2021 | Zhao | H04B 7/088 |
| 2021/0307061 | A1* | 9/2021 | Huang | H04W 74/0808 |

OTHER PUBLICATIONS

International Search Report and Written Opinion—PCT/CN2021/079041—ISA/EPO—Dec. 1, 2021.

Qualcomm Incorporated: "Channel Access Mechanism for NR in 52.6 to 71GHz Band", 3GPP TSG RAN WG1 Meeting #102-e, R1-2006798, e-Meeting, Aug. 17-Aug. 28, 2020, 13 Pages, Sections 2.1-2.5, The Whole Document.

Zte, et al., "On the Channel Access Mechanism for Above 52.6GHz", R1-2007966, 3GPP TSG RAN WG1 #103-e, e-Meeting, Oct. 26-Nov. 13, 2020, Sections 1-2, pp. 1-9.

* cited by examiner

1330

| Scenario | Beam #1 | Beam #2 | Beam #3 | Beam #4 |
|---|---|---|---|---|
| 1332 LT sensing energy detected | Low | Low | High | High |
| 1334 Outcome | No LBT | No LBT | LBT | LBT |

1340

| Scenario | Beam #1 | Beam #2 | Beam #3 | Beam #4 |
|---|---|---|---|---|
| 1342 Antenna gain | High | High | Low | Low |
| 1334 Outcome | No LBT | No LBT | LBT | LBT |

COMBINATION OF CHANNEL ACCESS CONDITIONS

CROSS-REFERENCE TO RELATED APPLICATIONS

The present application is a 35 U.S.C. 371 National Phase entry of Patent Cooperation Treaty (PCT) Application No. PCT/CN2021/079041, filed Mar. 4, 2021, which is hereby expressly incorporated herein by reference in its entirety.

TECHNICAL FIELD

This application relates to wireless communication systems, and more particularly to channel access in a shared radio frequency band in a shared spectrum or an unlicensed spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5$^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

As use cases and diverse deployment scenarios continue to expand in wireless communication, spectrum sharing technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a wireless communication device, the method including determining a channel access procedure based on whether one or more channel access conditions are satisfied for accessing an unlicensed frequency band, where the one or more channel access conditions are associated with at least one of sensing across multiple channel occupancy times (COTs), a transmission beam characteristic, a transmit power, a transmission duty cycle, or a beam dwell time; and transmitting, based on the channel access procedure, a communication signal in the unlicensed frequency band.

In an additional aspect of the disclosure, a wireless communication device comprising a memory; a transceiver; and at least one processor coupled to the memory and the transceiver, where the at least one processor is further configured to determine a channel access procedure based on whether one or more channel access conditions are satisfied for accessing an unlicensed frequency band, where the one or more channel access conditions are associated with at least one of sensing across multiple channel occupancy times (COTs), a transmission beam characteristic, a transmit power, a transmission duty cycle, or a beam dwell time; and transmit, via the transceiver, based on the channel access procedure, a communication signal in the unlicensed frequency band.

In an additional aspect of the disclosure, a non-transitory computer-readable medium having program code recorded thereon for wireless communication by a wireless communication device, the program code including code for causing a wireless communication device to determine a channel access procedure based on whether one or more channel access conditions are satisfied for accessing an unlicensed frequency band, where the one or more channel access conditions are associated with at least one of sensing across multiple channel occupancy times (COTs), a transmission beam characteristic, a transmit power, a transmission duty cycle, or a beam dwell time, the wireless communication device including a base station (BS) or a user equipment (UE); and code for causing the wireless communication device to transmit, based on the channel access procedure, a communication signal in the unlicensed frequency band.

In an additional aspect of the disclosure, a wireless communication device comprising means for determining a channel access procedure based on whether one or more channel access conditions are satisfied for accessing an unlicensed frequency band, where the one or more channel access conditions are associated with at least one of sensing across multiple channel occupancy times (COTs), a transmission beam characteristic, a transmit power, a transmission duty cycle, or a beam dwell time, the wireless communication device including abase station (BS) or a user equipment (UE); and means for transmitting, based on the channel access procedure, a communication signal in the unlicensed frequency band.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
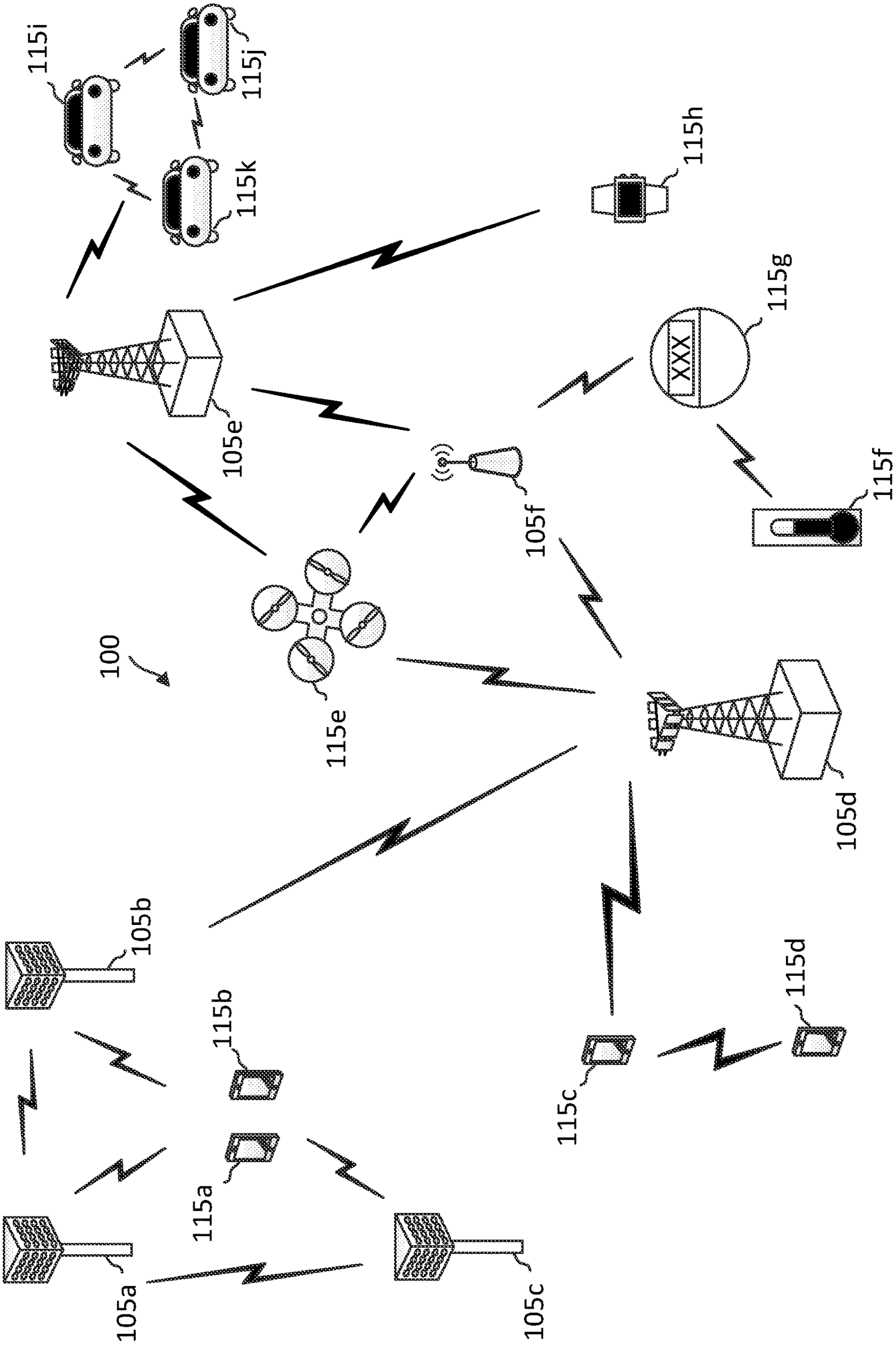
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/$km^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (IMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

To enable coexistence among multiple devices in a shared or unlicensed spectrum, a listen-before-talk (LBT) procedure may be used to assess whether a shared channel is clear before transmitting a signal in the channel. During the LBT procedure, a device may perform a clear channel assessment (CCA) for a predetermined duration to contend for a channel occupancy time (COT). During the CCA, the device may compare the energy level detected in the channel to a threshold value. If the energy level exceeds the threshold, the device may determine that the channel is occupied, refrain from transmitting a signal in the channel, and repeat the CCA after a period of time, or the device may reduce its transmit power to avoid interfering with other devices that may be using the channel. If the energy level is below the threshold, the device may determine that the channel is unoccupied (indicating the device won the contention) and proceed with transmitting a signal in the COT.

The unlicensed spectrum that are available for wireless communications may include 5 gigahertz (GHz) bands, 6 GHz bands, and 60 GHz bands. One of the key driver for LBT in the 60 GHz bands is European Telecommunications Standards Institute (ETSI). To that end, in a first ETSI operating mode, a mobile or fixed wireless communication device or node is mandated to perform an LBT prior to accessing an unlicensed band in the 60 GHz range. However, performing an LBT prior to each and every transmission can be an inefficient use of resources as a result of the overhead and delays associated with the LBT. Further, a device or node communicating over a 60 GHz band is likely to use beamformed signals to compensate the high signal attenuation at the high frequency. A beamformed signal may focus its signal energy in a specific beam direction towards an intended receiver, and thus multiple transmitters can transmit at the same time in different spatial directions without interfering with each other or with a minimal interference. Accordingly, in a second ETSI operating mode (which is under studies for standardization), a mobile or fixed wireless communication device or node may transmit without performing an LBT if the device or node uses a certain antenna gain for the transmission. Antenna gain may be correlated to a transmission beam width. For example, a high antenna gain may produce a narrower beam than a lower antenna gain. That is, the second ETSI operating mode allows a device to skip LBT when a transmission is transmitted using a narrow transmission beam. While utilizing a high antenna gain to generate a narrow beam for transmission and/or reception can reduce the likelihood of collisions, beam collisions can occur and there is no detection or mitigation when LBT is simply skipped.

Other techniques, such as long-term channel sensing, setting a limit for a transmit power, setting a limit for a duty cycle (e.g., a transmission to be within D % of total time), or setting a limit for beam dwell time (e.g., a maximum transmission duration along a certain beam direction) at a transmitting or initiating device, may be applied to mitigate interference or reduce the likelihood of beam collisions, but each of these techniques has its own strengths and weaknesses. For instance, limiting a transmit power at a transmitting device can reduce inter-cell interference, but it reduces the receive signal strength at a corresponding receiving device, and thus may also limit the peak coverage or reach of the transmitting device. Further, it cannot reduce or avoid beam collisions. On the other hand, limiting a duty cycle or beam dwell time at a transmitting device can reduce the likelihood of beam collisions (in a statistical sense). However, limiting a duty cycle or a beam dwell time limit can impact the system throughput due to the limited transmission time. Further, limiting a duty cycle or a beam dwell time can lead to under-utilization of resources. For example, the transmitting device may not transmit due to the limitation on the duty cycle or beam dwell time even when the channel is unoccupied or free. The other technique, long-term sensing, where a transmitting device may perform sensing over a long period of time across multiple transmission periods or COTs (e.g., at periodic measurement occasions) instead of performing sensing only when there is data ready for transmission, can also reduce the likelihood of beam collisions, but may be limited to a per-link basis and/or on a reactive basis. Further, the beam collision avoidance performance from long-term sensing may vary. For example, long-term sensing may be effective in avoiding a beam collision when synchronous sensing is used (where sensing windows are fixed for all nodes sharing the channel), but may not perform well when asynchronous sensing is used (where a node may perform CCA at any time and may transmit at any time upon a successful CCA).

The present disclosure describes mechanisms for determining channel access mechanism(s) or procedure(s) for accessing an unlicensed frequency band (e.g., at 20 GHz, 40 GHz, 60 GHz or higher) using a hierarchical channel access condition framework. For instance, a wireless communication device, which may be abase station (BS) or a user equipment (UE), may determine a channel access procedure based on whether one or more channel access conditions are satisfied for accessing an unlicensed frequency band. The one or more channel access conditions are associated with at least one of sensing across multiple channel occupancy times (COTs) (e.g., long-term sensing), a transmission beam characteristic, a transmit power, a transmission duty cycle, or a beam dwell time. Subsequently, the wireless communication device may transmit, based on the channel access procedure, a communication signal in the unlicensed frequency band.

In some aspects, the one or more channel access conditions may include a combination of channel access conditions arranged in a hierarchy (e.g., a multi-level arrangement) with one or more primary channel access conditions at a first level of the hierarchy, one or more secondary channel access condition at a second level of the hierarchy, one or more tertiary channel access condition at a third level of the hierarchy, and so on. In some aspects, the wireless communication device may determine whether a primary channel access condition (e.g., a first channel access condition) of the one or more channel access conditions is satisfied. Further, in some aspects, in response to determining whether the primary channel access condition is satisfied, the wireless communication device may determine whether a secondary channel access condition (e.g., a second channel access) of the one or more channel access conditions is satisfied. For instance, each of the first channel access condition and the second channel access condition is associated with a different one of the at least one of the sensing across the multiple COTs, the transmission beam characteristic, the transmit power, the transmission duty cycle, or the beam dwell time. Further, in some aspects, in response to determining whether the secondary channel access condition is satisfied, the wireless communication device may determine whether a tertiary channel access condition (e.g., a third channel access condition) of the one or more channel access conditions is satisfied. For instance, each of the first channel access condition, the second channel access condition, and the third channel access condition is associated with a different one of the at least one of the sensing across the multiple COTs, the transmission beam characteristic, the transmit power, the transmission duty cycle, or the beam dwell time. In general, the wireless communication device may be configured with a primary channel access condition at a first level of the hierarchy or may select a primary channel access condition from a plurality of channel access conditions, and may determine a channel access condition at each subsequent level of the hierarchy based on an outcome of a channel access condition at a previous level of the hierarchy.

In some aspects, the wireless communication device may determine whether the one or more channel access condition are satisfied. For instance, the wireless communication device may determine whether a strong interferer is detected from the sensing across the multiple transmissions periods or COTs, for example, based on whether a channel energy measurement satisfies a threshold. Additionally or alternatively, the wireless communication device may determine whether the communication signal is to be transmitted using a narrow beam, for example, based on an antenna gain threshold, a different threshold associated with a difference between a transmit power and an equivalent isotropically radiated power (ERP) threshold, and/or a beam width threshold. Additionally or alternatively, the wireless communication device may determine whether a transmit power to be used for transmitting the communication signal satisfies a threshold. Additionally or alternatively, the wireless communication device may whether a transmission duty cycle to be used for transmitting the communication signal satisfies a threshold. Additionally or alternatively, the wireless communication device may whether a beam dwell time associated with a transmission beam to be used for transmitting the communication signal satisfies a threshold.

In some aspects, as part of determining the channel access procedure, the wireless communication device may determine whether to perform an LBT, whether to perform long-term sensing, whether to utilize a narrow beam for transmission, whether to restrict a transmit power, whether to restrict a transmission duty cycle, and/or whether to restrict a beam dwell time, respectively. For example, in some aspects, the wireless communication device may determine that the communication signal can be transmitted without performing an LBT when a first channel access condition (e.g., a primary channel access condition, a secondary channel access condition, or a tertiary channel access condition) of the one or more channel access condition is satisfied. Further, in some aspects, the wireless communication device may determine that the communication signal can be transmitted without an LBT, but may apply a restriction to at least one of a transmit power, a transmission duty cycle, and/or a beam dwell time for the transmission. In other aspects, the wireless communication device may determine that the communication signal is to be transmitted based on an LBT when a first channel access condition (e.g., a primary channel access condition, a secondary channel access condition, or a tertiary channel access condition) of the one or more channel access condition is not satisfied. Further, in some aspects, the wireless communication device may determine that the communication signal is to be transmitted with restrictions on a transmit power, a transmission duty cycle, and/or abeam dwell time in addition to an LBT.

Aspects of the present disclosure can provide several benefits. For example, the hierarchical channel access condition framework may allow for channel access conditions to be combined for determining whether an LBT may skipped, rather than simply skipping an LBT based on a single condition such as the use of a narrow beam for a transmission. Further, the hierarchical channel access condition framework can combine different channel access conditions in a way that maximizes the strengths of each channel access condition and/or minimizes the weaknesses of each channel access condition. Accordingly, the present disclosure can improve channel access performance (e.g., reducing collisions). Further, the present disclosure may allow a wireless communication device to transmit without performing an LBT at some instances based on assessments of a combination of channel access conditions, and may mandate the wireless communication device to restrict at least one of a transmit power, a transmission duty cycle, and/or a beam dwell time for a transmission and/or perform an LBT prior to the transmission at other instances. Accordingly, the present disclosure can reduce LBT overhead at wireless communication devices (communicating over an unlicensed band) while reducing the likelihood of beam collisions in the unlicensed band.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may operate over a mmWave band (e.g., at 60 GHz). Due to the high pathloss in the mmWave band, the BSs 105 and the UEs 115 may utilize directional beams to communicate with each other. For instance, a BS 105 and/or a UE 115 may be equipped with one or more antenna panels or antenna arrays with antenna elements that can be configured to focus transmit signal energy and/or receive signal energy in a certain spatial direction and within a certain spatial angular sector or width. In general, a BS 105 and/or a UE 115 may be capable of generating a transmission beam for transmission or a reception beam for reception in various spatial direction or beam directions.

As used herein, the term "transmission beam" may refer to a transmitter transmitting a beamformed signal in a certain spatial direction or beam direction and/or with a certain beam width covering a certain spatial angular sector. The transmission beam may have characteristics such as the beam direction and the beam width. The term "reception beam" may refer to a receiver using beamforming to receive a signal from a certain spatial direction or beam direction and/or within a certain beam width covering a certain spatial angular sector. The reception beam may have characteristics such as the beam direction and the beam width.

Figure 2:
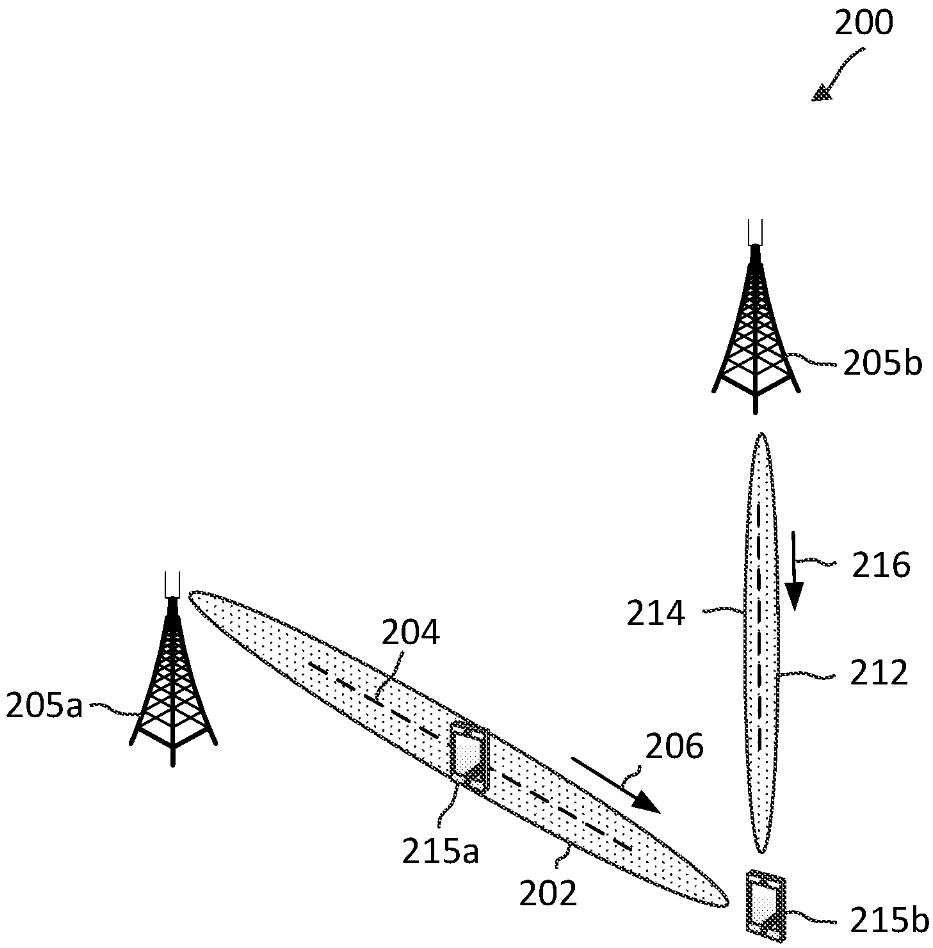
FIG. 2 illustrates a communication scenario according to some aspects of the present disclosure.

FIG. 2 illustrates a communication scenario 200 according to aspects of the present disclosure. The communication scenario 200 may correspond to a communication scenario among BSs 105 and or UEs 115 in the network 100. For simplicity, FIG. 2 illustrates two BSs 205 (shown as **205*a* and 205*b*) and two UEs 215 (shown as 215*a* and 215*b*), but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115**, respectively.

In the scenario 200, the BS **205*a* may serve the UE 215*a*, and the BS 205*b* may serve the UE 215*b*. In some aspects, the BS 205*a* and the UE 215*a* may be operated by one network operating entity, and the BS 205*b* and the UE 215*b* may be operated by a different network operating entity. In some aspects, the BS 205*a* and the UE 215*a* may communicate with each other using one RAT, and the BS 205*b* and the UE 215***b* may communicate with each other using a different RAT. For instance, the BS 205*a* and the UE 215*a* may be WiFi devices, and the BS 205*b* and the UE 215*b* may be NR-U devices. NR-U may refer to the deployment of NR over an unlicensed spectrum.

The BSs 205 and the UEs 215 may communicate over a mmWave band. The mmWave band may be at any mmWave frequencies (e.g., at 20 GHz, 30 GHz, 60 GHz or higher). As explained above, the high mmWave frequencies can have a high pathloss, and a device operating over such frequencies may use beamforming for transmission and/or reception to compensate the high signal attenuation. For instance, the BS 205*a* may be capable of generating a number of directional transmission beams in a number of beam or spatial directions (e.g., about 2, 4, 8, 16, 32, 64 or more) and may select a certain transmission beam or beam direction to communicate with the UE 215*a* based on the location of the UE 215*a* in relation to the location of the BS 205*a* and/or any other environmental factors such as scatterers in the surrounding. For example, the BS 205*s* may select a transmission beam that provides a best quality (e.g., with the highest receive signal strength) for communication with the UE 215*a*. The UE 215*a* may also be capable of generating a number of directional transmission beams in a number of beam or spatial directions (e.g., about 2, 4, 8 or more) and may select a certain transmission beam that provides the best quality (e.g., with the highest receive signal strength) to communicate with the BS 205*a*. In some instances, the BS 205*a* and the UE 115*a* may perform a beam selection procedure with each other to determine a best UL beam and a best DL beam for communications. Similarly, each of the BS 205*b* and the UE 215*b* may be capable of generating a number of directional transmission beams in a number of beam or spatial directions and may select a most suitable or best transmission beam or beam direction to communicate with each other.

In the illustrated example of FIG. 2, the BS 205*a* may transmit a transmission to the UE 215*a* using a transmission beam 202 in a direction 206 along a line-of-sight (LOS) path 204, and the UE 215*a* may use a reception beam in the reverse direction (of the direction 206) to receive the transmission. The BS 205*b* may transmit a transmission to the UE 215*b* using a transmission beam 212 in a direction 216 along a LOS path 214, and the UE 215*b* may use a reception beam in the reverse direction (of the direction 216) to receive the transmission. Each of the transmission beam 202 and the transmission beam 212 may be narrow transmission beams. A transmission beam may be characterized by its beam width. In some examples, a beam may have a half-power beam width, which is the angular separation where the magnitude of the radiation pattern decreases by about 50% (or −3 dB) from the peak of the mean beam or main lobe. As an illustrative example, a beam generated using 16 antenna elements in a horizontal arrangement may be regarded as a narrow beam when the half-power bandwidth is less than a threshold of about 6 or 7 degrees. However, these values are not to be interpreted as limiting, as other beam width threshold values are contemplated for a narrow beam.

Narrow beam transmissions can be used as a coexistence mechanism for spectrum sharing since the transmission beam may focus the transmission signal energy in a specific beam direction, and thus may be less likely to interfere with transmissions and/or receptions of neighboring devices. However, beam collisions can occur even with narrow beam transmission. As shown in FIG. 2, the transmission beam 202 from the BS 205*a* can collide with the transmission beam 212 from the BS 205*b*, causing interference to the UE 215*b*.

Accordingly, while using narrow beams for transmissions as a coexisting mechanism for spectrum sharing may provide statistically good outcomes (with no collisions), using narrow beams for transmission alone cannot avoid beam collisions.

Figure 3:
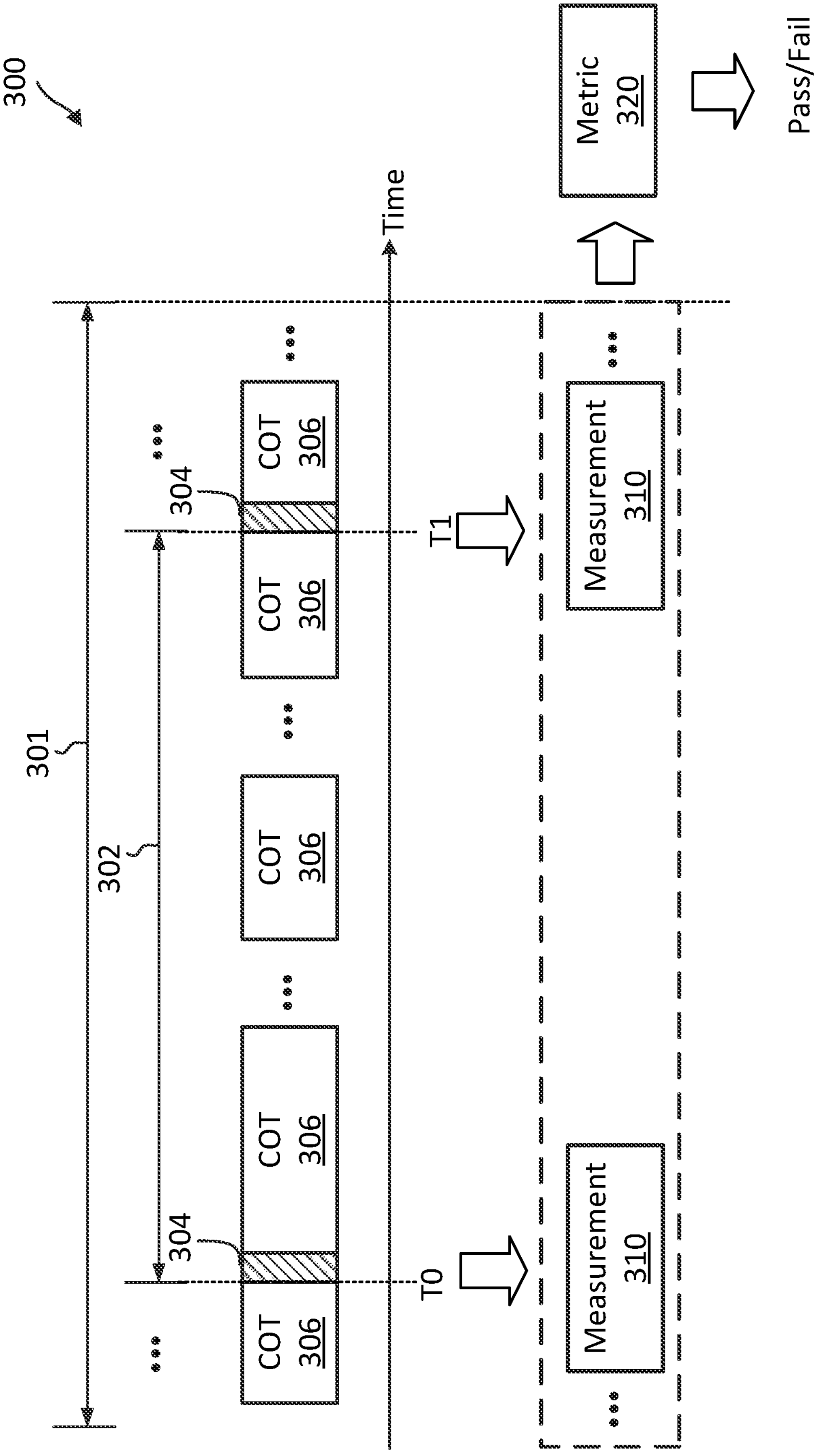
FIG. 3 illustrates a long-term sensing scheme according to some aspects of the present disclosure.

FIG. 3 illustrates a long-term sensing scheme 300 according to some aspects of the present disclosure. The scheme 300 may be employed by BSs such as the BSs 105 and/or 205 and/or UEs such as the UEs 115 and/or 215. In particular, a wireless communication device (e.g., a BS or a UE) may perform long-term sensing as shown in the scheme 300. Long-term sensing may refer to a device performing channel sensing and/or channel measurements over a long period of time, across multiple COTs (or transmission periods) instead of performing sensing or LBT packet-by-packet. The channel measurements obtained over the long period of time may provide an indication on whether there are any neighboring nodes sharing the same channel as the device.

In the scheme 300, devices (e.g., the BSs 105 and/or 205 and the UEs 115 and/or 215) are configured with measurement occasions 304 (e.g., at time T0 and T1). The measurement occasions 304 may be periodic, for example, repeating at a time interval 302. The repeating time interval 302 can have any suitable duration (e.g., about 50 milliseconds (ms), 100 ms, 200 ms or more). Each device may perform channel measurements during the measurement occasions 304. For instance, during each measurement occasion 304, the device may measure the channel energy (e.g., measurement 310) in the shared channel. For example, the device may compute a received signal power at each measurement occasion 304. The device may configure a frontend (e.g., the RF unit 1414 of FIG. 14 or the RF unit 1514 of FIG. 15) and/or a transceiver (e.g., the transceiver 1410 of FIG. 14 or the transceiver 1510 of FIG. 15) at the device to receive signals from one or more spatial directions via analog and/or digital beamforming. In some aspects, the device may measure the channel energy in all spatial directions. The device may collect statistics related to the channel measurements 310 over a long-term period 301. The long-term period 301 may have any suitable duration (e.g., 0.1 second, 1 second, 2 seconds, 10 seconds, 60 secs or more). In some aspects, the long-term period 301 may include multiple measurement occasions 304 (e.g., 5, 10, 20, or 30 or more).

The device may determine a metric 320 from the measurements 310 collected over the long-term period 301. The metric 320 may be a certain statistical metric over the measurements 310 obtained during the long-term period 301. For instance, the metric 320 can be an average channel energy measurement, a maximum channel energy measurement, a percentage of measurements above a threshold, a number of consecutive measurements above a threshold, and/or a variance of the measurements 310 the long-term period 301. Since the channel measurements 310 are obtained over a long-term period 301 (across multiple transmission periods or COTs 306), the long-term sensing channel measurements 310 can provide an indication of whether there is a strong interferer nearby the measuring device. In an example, the device may compare the metric 320 to a threshold and an indication of a pass or failure may be generated. For instance, if the metric 320 is below the threshold, a pass indication may be generated to indicate that there is no strong interferer nearby the measuring device. If, however, the metric 320 exceeds the threshold, a failure indication may be generated to indicate that there is a strong interferer nearby the measuring device.

While long-term sensing can reduce the likelihood of beam collisions, long-term sensing may be limited to a per-link basis. That is, long-term sensing is between a not a coordinated scheme among multiple links. Further, long-term sensing is reactive (where certain operations can be performed upon detecting a strong interferer) as opposed to LBT, which proactively listen to the channel to avoid a collision.

As explained above, while each of narrow beam for transmission, long-term sensing, transmit power limitation, transmission duty cycle limitation, or beam dwell time limitation techniques may be used to improve coexistence for spectrum sharing, each of these techniques alone may not be sufficient or effective in reducing or avoiding beam collisions, for example, for communications over a 60 GHz band.

Accordingly, the present disclosure provides techniques for a wireless communication device (e.g., a BS 105, a BS 205, a UE 115, and/or a UE 215) to determine a channel access mechanism or a channel access procedure based on a combination of channel access conditions. The channel access conditions can be based upon whether a wireless communication device performs long-term sensing, utilize a narrow beam for transmission, and/or consider a transmit power, a transmission duty cycle, and/or a beam dwell time for transmission to mitigate interference. The channel access conditions can be combined in away that exploits the strengths of each channel access condition and avoids the weaknesses of the each channel access condition, and may form a hierarchical framework with multi-levels of channel access conditions (e.g., primary channel access condition(s), secondary channel access condition(s), tertiary channel access condition(s), and so on.). Additionally, the channel access procedure or outcomes from the hierarchical framework (shown in FIGS. 5-7, 8A-8F, and 9-13) may include various operations other than simply performing an LBT prior to a transmission or skipping an LBT prior to a transmission. In some aspects, the channel access procedure can indicate whether an LBT may be performed prior to a transmission, whether long-term sensing may be performed (e.g., obtaining a channel measurement at every Q ms, where Q may be 10, 20, 100, or more) to determine interferer nearby the device, whether a narrow beam may be used for transmission (e.g., with an antenna gain or beam width satisfying a certain threshold), whether a transmission duty cycle may be limited (e.g., with active transmission over D % of a total time), whether a transmission beam dwell time may be limited (e.g., with a duration of contiguous transmission in a certain beam direction to be less than a certain time threshold), or any combination thereof.

Figure 4:
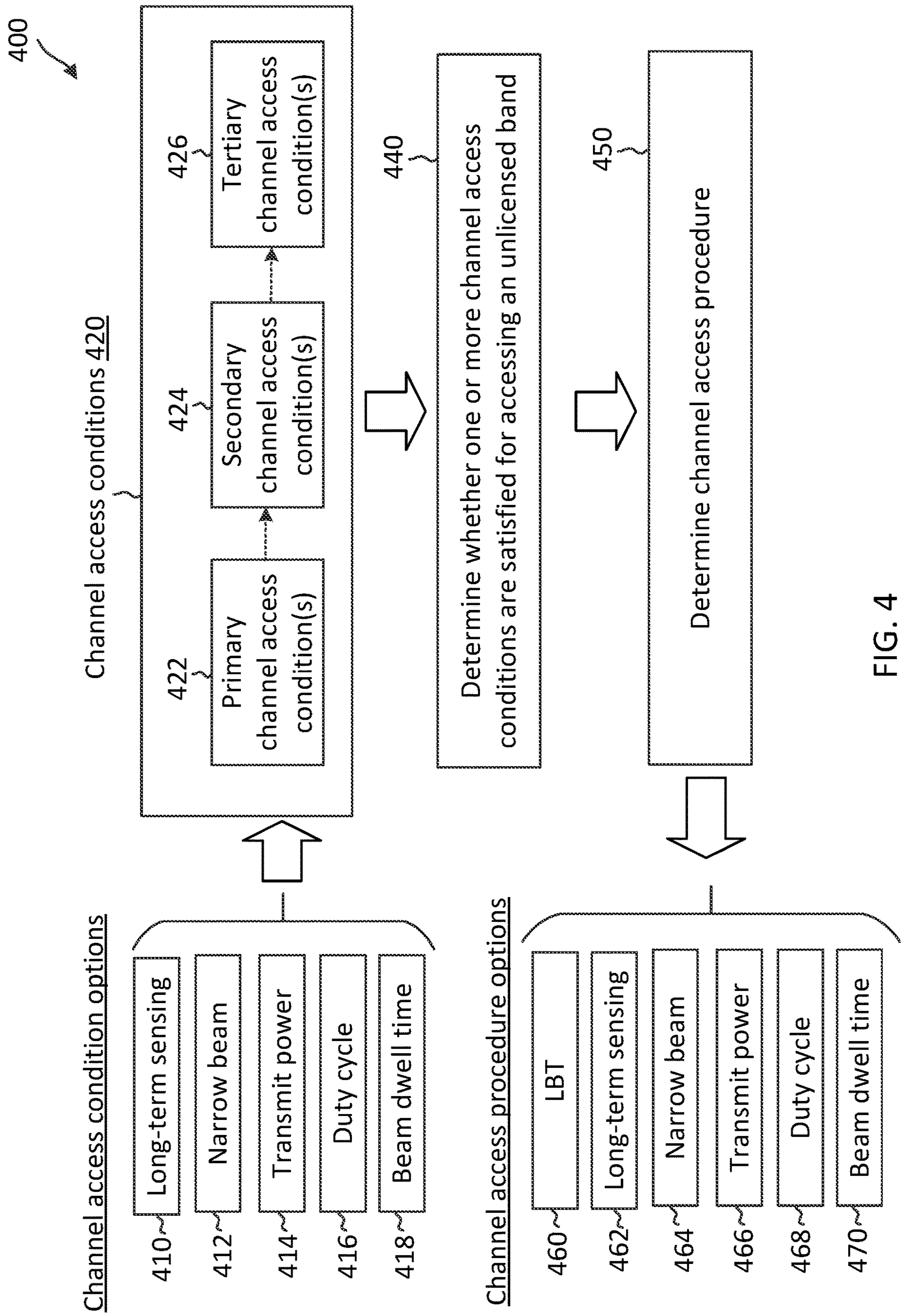
FIG. 4 illustrates a hierarchical channel access scheme according to some aspects of the present disclosure.

FIG. 4 illustrates a hierarchical channel access scheme 400 according to some aspects of the present disclosure. The scheme 400 may be employed by BSs such as the BSs 105 and/or 205 and/or UEs such as the UEs 115 and/or 215. In particular, a wireless communication device (e.g., a BS or a UE) may perform channel access in an unlicensed band, for example, in the 60 GHz range, utilizing a combination of channel access conditions as shown in the scheme 400.

In the scheme 400, at block 440, a wireless communication device (e.g., a BS 105, 205 or a UE 115, 215) may determine whether one or more channel access conditions 420 are satisfied for accessing an unlicensed band (e.g., at 60 GHz range). In some aspects, the channel access conditions 420 may include a combination of one or more primary channel access conditions 422, one or more secondary channel access conditions 424, and/or one or more tertiary channel access conditions 426. The primary channel access condition(s) 422, the secondary channel access condition(s) 424, and the tertiary channel access condition(s) 426 may be arranged in a hierarchy with a tree-like arrangement. For instance, the primary channel access condition(s) 422 may be a first level of channel access condition(s), the secondary channel access condition(s) 424 may be a second level of channel access condition(s) dependent on outcomes from the primary channel access condition(s) 422 (e.g., branching out from the primary channel access condition(s) 422), and the tertiary channel access condition(s) 426 may be a third level of channel access condition(s) dependent on outcomes from the secondary channel access condition(s) 424 (e.g., branching out from the secondary channel access condition(s) 424) as discussed in greater detail below with reference to FIGS. 5-7, 8A-8F, and 9-13. Although FIG. 4 illustrates the channel access conditions 420 including three levels (e.g., primary, secondary, and tertiary) of channel access conditions, it should be understood that the scheme 400 may utilize a fewer number of levels of channel access conditions (e.g., 1 or 2) or a greater number of levels of channel access conditions (e.g., 4 or more).

In some aspects, the wireless communication device may determine a channel access condition 420 from a list of channel access condition options 410, 412, 414, 416, and 418 associated with performing long-term sensing, utilizing a narrow beam for transmission, restricting a transmit power, restricting a transmission duty cycle, and/or restricting abeam dwell time, respectively. However, it will be understood that other channel access condition options are also contemplated by the present disclosure.

In some aspects, when the wireless communication device selects the long-term sensing option 410 for a channel access condition 420, the wireless communication device may perform sensing over a long period (e.g., periodic sensing at every Q ms) across multiple COTs, for example, utilizing the scheme 300 discussed above with reference to FIG. 3, and may determine whether the channel access condition 420 is satisfied based on a channel measurement threshold (e.g., E decibels (dB)). For instance, if a channel measurement from the long-term sensing is below the channel measurement threshold (e.g., indicating no strong interferer nearby the device), the channel access condition 420 is satisfied. If, however, the channel measurement from the long-term sensing exceeds the channel measurement threshold (e.g., indicating strong interferer nearby the device), the channel access condition 420 is not satisfied.

In some aspects, when the wireless communication device selects the narrow beam option 412 for a channel access condition 420 associated with a narrow beam transmission, the wireless communication device may determine whether a narrow beam is to be used for a transmission based on an antenna gain, a difference between a transmit power and an EIRP, or a beam width to be used for the transmission. In one aspect, when the wireless communication device utilizes an antenna gain as an indication for a narrow beam, the wireless communication device may determine whether an antenna gain associated with a transmission beam to be used for an upcoming transmission (e.g., where the channel access is to be performed for) satisfies an antenna gain threshold (e.g., X dB). Antenna gain has a correlation to a transmission beam width. For example, a high antenna gain may produce a narrower beam than a lower antenna gain. For instance, the wireless communication device may configure an RF frontend (e.g., RF units 1414 and/or 1514) at the wireless communication device to generate a transmission beam for transmission and may apply a certain antenna gain for the generation of the transmission beam. If the wireless communication device is to apply an antenna gain (for the upcoming transmission) greater than or equal to the antenna threshold, the channel access condition 420 is satisfied. If, however, the antenna gain is less than antenna gain threshold, the channel access condition 420 is not satisfied. In some aspects, the antenna gain may include antenna element gain and an antenna array gain. For instance, the wireless communication device may include an array of antenna elements. The antenna element gain may refer to the gain (e.g., power gain) at each individual antenna element, and the array gain may refer to the power gain of a transmitted signal.

In another aspect, when the wireless communication device utilizes an antenna gain as an indication for a narrow beam, the wireless communication device may determine whether a difference between a transmit power and an EIRP associated with a transmission beam to be used for an upcoming transmission (e.g., where the channel access is to be performed for) satisfies a threshold (e.g., Y dB). The transmit power may be a conducted transmit power, which is the transmitter power at the RF frontend (e.g., RF units 1414 and/or 1514) of the wireless communication device. The EIRP may refer to the product of transmitter power and the antenna gain in a given direction relative to an isotropic antenna of a radio transmitter. A transmission with a narrow beam may have a large difference between a transmit power and an EIRP. As such, if the difference between the transmit power and the EIRP greater than or equal to the difference threshold, the channel access condition 420 is satisfied. If, however, the difference between the transmit power and the EIRP is less than the threshold, the channel access condition 420 is not satisfied. In some instances, the wireless communication device may determine the EIRP or conducted power based on a pre-configuration. For instance, the wireless communication device may have transmission power data associated with conducted power and/or EIRP and corresponding transmit configurations stored at a memory (e.g., the memory 1404 and/or 1504). The transmission power data may be pre-calibrated, for example. The wireless communication device may calculate or determine the conducted transmit power and/or EIRP by reading the configuration data from the memory, for example, for a certain transmit configuration.

In yet another aspect, when the wireless communication device utilizes an antenna gain as an indication for a narrow beam, the wireless communication device may determine whether a beam width of a transmission beam to be used for an upcoming transmission (e.g., where the channel access is to be performed for) satisfies a beam width threshold. A narrow transmission beam may have a small beam width, for example, with a half-power beam width less than a certain threshold (e.g., Z degree(s)). The half-power beam width may refer to the angular separation in which the magnitude of the radiation pattern decreases by about 50% (or −3 dB) from the peak of the main beam. As such, if the beam width is less than the beam width threshold, the channel access condition 420 is satisfied. If, however, the beam width is greater than or equal to the beam width threshold, the channel access condition 420 is not satisfied.

In some aspects, when the wireless communication device selects the transmit power option 414 for a channel access condition 420, the wireless communication device may determine whether a transmit power to be used for an upcoming transmission (e.g., where the channel access is to be performed for) satisfies a transmit power threshold (e.g., P decibel-milliwatts (dBm)). For instance, if the transmit power is less than the transmit power threshold, the channel access condition 420 is satisfied. If, however, the transmit power is greater than or equal to the transmit power threshold, the channel access condition 420 is not satisfied. In some aspect, the transmit power may be a conducted transmit power.

In some aspects, when the wireless communication device selects the transmission duty cycle option 416 for a channel access condition 420, the wireless communication device may determine whether a transmission duty cycle to be used for an upcoming transmission (e.g., where the channel access is to be performed for) satisfies a transmission duty cycle threshold (e.g., D % of active time out of a total time). For instance, if the upcoming transmission (active transmission duration) allows the wireless communication device to maintain a duty cycle less than the transmission duty cycle threshold, the channel access condition 420 is satisfied. If, however, the upcoming transmission (active transmission duration) causes the wireless communication device to have a transmission duty cycle exceeding the transmission duty cycle threshold, the channel access condition 420 is not satisfied.

In some aspects, when the wireless communication device selects the beam dwell time option 418 for a channel access condition 420, the wireless communication device may determine whether the beam dwell time associated with a transmission beam to be used for an upcoming transmission (e.g., where the channel access is to be performed for) satisfies a beam dwell time threshold. A beam dwell time may refer to a duration where contiguous transmission is performed in a certain beam direction. For instance, if the upcoming transmission (active transmission duration) allows the wireless communication device to maintain a beam dwell in the direction of the transmission beam to be less than the beam dwell time threshold (e.g., with a maximum of T1 ms on-time and T2 ms off-time), the channel access condition 420 is satisfied. If, however, the upcoming transmission (active transmission duration) causes the wireless communication device to have a beam dwell time in the direction of the transmission beam exceeding the beam dwell time threshold, the channel access condition 420 is not satisfied.

In some aspects, a primary channel access condition 422 may be selected from the long-term sensing option 410, the narrow beam option 412, the transmit power option 414, the transmission duty cycle option 416, and/or or a beam dwell time option 418. Accordingly, the primary channel access condition 422 may include at least one of a sensing result across multiple COTs, an antenna gain threshold, a transmit power threshold, a difference threshold for a difference between a transmit power and an EIRP, a transmission duty cycle threshold, or abeam dwell time threshold as discussed above.

In some aspects, a secondary channel access condition 424 may be selected from the long-term sensing option 410, the narrow beam option 412, the transmit power option 414, the transmission duty cycle option 416, and/or or a beam dwell time option 418. Accordingly, the secondary channel access condition 424 may include at least one of a sensing result across multiple COTs, an antenna gain threshold, a transmit power threshold, a difference threshold for a difference between a transmit power and an EIRP, a transmission duty cycle threshold, or a beam dwell time threshold as discussed above.

In some aspects, a tertiary channel access condition 426 may be may be selected from the long-term sensing option

410, the narrow beam option 412, the transmit power option 414, the transmission duty cycle option 416, and/or or a beam dwell time option 418. Accordingly, the tertiary channel access condition 426 may include at least one of a sensing result across multiple COTs, an antenna gain threshold, a transmit power threshold, a difference threshold for a difference between a transmit power and an EIRP, a transmission duty cycle threshold, or a beam dwell time threshold as discussed above.

At block 450, the wireless communication device may determine a channel access procedure for transmitting a communication signal in the unlicensed band based on whether the channel access conditions 420 are satisfied for accessing the unlicensed band. In some aspects, the wireless communication device may determine a channel access mechanism or procedure for a transmission from a list of channel access procedure options 460, 462, 464, 466, 468, and 470 associated with performing an LBT, performing long-term sensing, utilizing a narrow beam for transmission, restricting a transmit power, restricting a transmission duty cycle, and/or restricting a beam dwell time, respectively. However, it will be understood that other channel access procedure options are also contemplated by the present disclosure.

In some aspects, a channel access procedure based on the LBT option 460 may indicate whether the wireless communication device is to perform an LBT prior to a transmission. For instance, the wireless communication device may perform an LBT prior to transmitting a communication signal in the unlicensed band based on the channel access procedure. In other instances, the wireless communication device may transmit a communication signal in the unlicensed band without performing an LBT based on the channel access procedure.

In some aspects, a channel access procedure based on the long-term sensing option 462 may indicate whether the wireless communication device is to perform long-term sensing. For instance, the wireless communication device may perform long-term sensing (sensing across multiple COTs), for example, using the scheme 300 discussed above with reference to FIG. 3, based on the channel access procedure. The long-term sensing result may in turn be utilized as channel access condition for a subsequent transmission, for example. In other instances, the wireless communication device may not perform long-term sensing based on the channel access procedure.

In some aspects, a channel access procedure based on the narrow beam option 464 may indicate whether the wireless communication device is to utilize a narrow beam for transmission. For instance, the wireless communication device may transmit a communication signal in the unlicensed band based on an antenna gain threshold. As explained above, antenna gain may be correlated to a beam width. For example, the wireless communication device may generate a narrow transmission beam by configuring its antenna (e.g., the antennas 1416 and 1516) with an antenna gain that is greater than the antenna gain threshold (e.g., >X dB) and transmit the communication signal using the transmission beam. In some other instances, the wireless communication device may transmit a communication signal in the unlicensed band based on a difference threshold between a transmit power (e.g., a conducted transmit power) and an EIRP. As explained above, a difference between a transmit power and an EIRP may be indicative of a beam width. For example, the wireless communication device may generate a narrow transmission beam by configuring its RF frontend (e.g., RF units 1414 and 1514) such that a difference between a transmit power and an EIRP is greater than the difference threshold (e.g., >Y dB) and transmit the communication signal using the transmission beam. In yet other instances, the wireless communication device may transmit a communication signal in the unlicensed band based on a beam width threshold. For example, the wireless communication device may configure its RF frontend (RF units 1414 and 1514) to generate a transmission beam with a beam width at a certain power level (e.g., a half-power beam width) that is less than the beam width threshold (e.g., <Z degrees) and transmit the communication signal using the transmission beam. In other instances, the wireless communication device may not consider the antenna gain threshold, the difference threshold, and/or the beamwidth threshold when transmitting the communication signal. For instance, the wireless communication device may apply an antenna gain less than X dB, use a transmit power and an EIRP with a difference less than Y dB, or use a transmission beam with a beam width wider than Z degrees for the transmission.

In some aspects, a channel access procedure based on the transmit power option 468 may indicate whether the wireless communication device is to limit its transmit power for transmission. For instance, the wireless communication device may transmit a communication signal in the unlicensed band based on a transmit power threshold. For example, the wireless communication device may configure its RF frontend (e.g., RF units 1414 and/or 1514) to output a transmit power (e.g., a conducted transmit power) that is less than the transmit power threshold (e.g., <P dBm) and transmit the communication signal using the transmit power. In other instances, the wireless communication device may not consider the transmit power threshold when transmitting the communication signal. For instance, the wireless communication device may use a transmit power higher than P dBm for the transmission.

In some aspects, a channel access procedure based on the transmission duty cycle option 470 may indicate whether the wireless communication device is to limit its transmission duty cycle for transmission. For instance, the wireless communication device may transmit a communication signal in the unlicensed band based on a transmission duty cycle threshold. For example, the wireless communication device may determine a transmission time (e.g., delaying a transmission time) or a duration (e.g., shortening a transmission duration, for example, using a higher MCS or truncating a data packet) for transmitting the communication signal such that the wireless communication device can maintain a transmission duty cycle that is below the transmission duty cycle threshold (e.g., <D % of active time out of a total time). In other instances, the wireless communication device may not consider the transmission duty cycle threshold when transmitting the communication signal. For instance, the wireless communication device may transmit with a duty cycle greater than D % of active time out of a total time.

In some aspects, a channel access procedure based on the beam dwell time option 472 may indicate whether the wireless communication device is to limit its beam dwell time for transmission. For instance, the wireless communication device may transmit a communication signal in the unlicensed band based on a beam dwell time threshold. For example, the wireless communication device may determine a transmission time (e.g., delaying a transmission time) or a duration (e.g., shortening a transmission duration, for example, using a higher MCS or truncating a data packet) for transmitting the communication signal in a certain beam direction such that the wireless communication device can maintain a beam dwell time that is below the beam dwell time threshold (e.g., with a maximum of T1 ms on-time and T2 ms off-time in a certain beam direction). Alternatively, the wireless communication device may select a next best beam direction that can satisfy the beam dwell time threshold for transmitting the communication signal. In other instances, the wireless communication device may not consider the beam dwell time threshold when transmitting the communication signal. For instance, the wireless communication device may transmit in a beam direction for longer than T1 ms and/or with shorter than T2 ms off-time.

Figure 5:
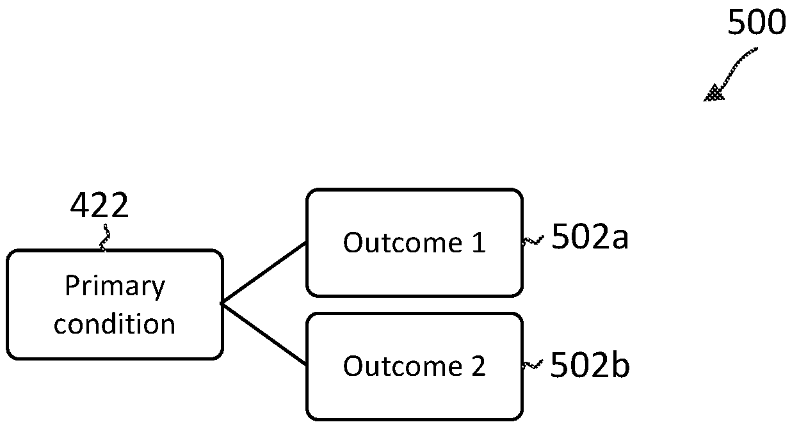
FIG. 5 illustrates a hierarchical channel access scheme according to some aspects of the present disclosure.
Figure 6:
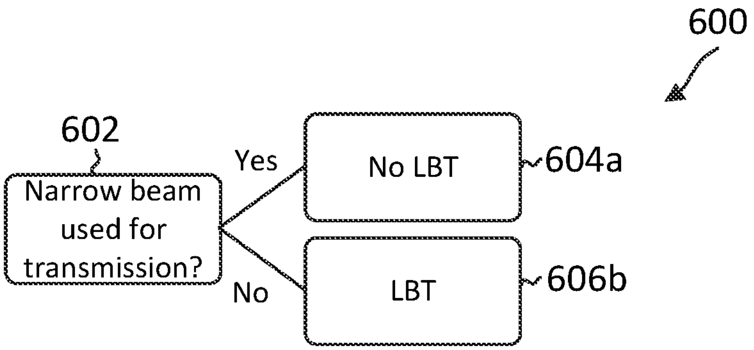
FIG. 6 illustrates a hierarchical channel access scheme according to some aspects of the present disclosure.
Figure 9:
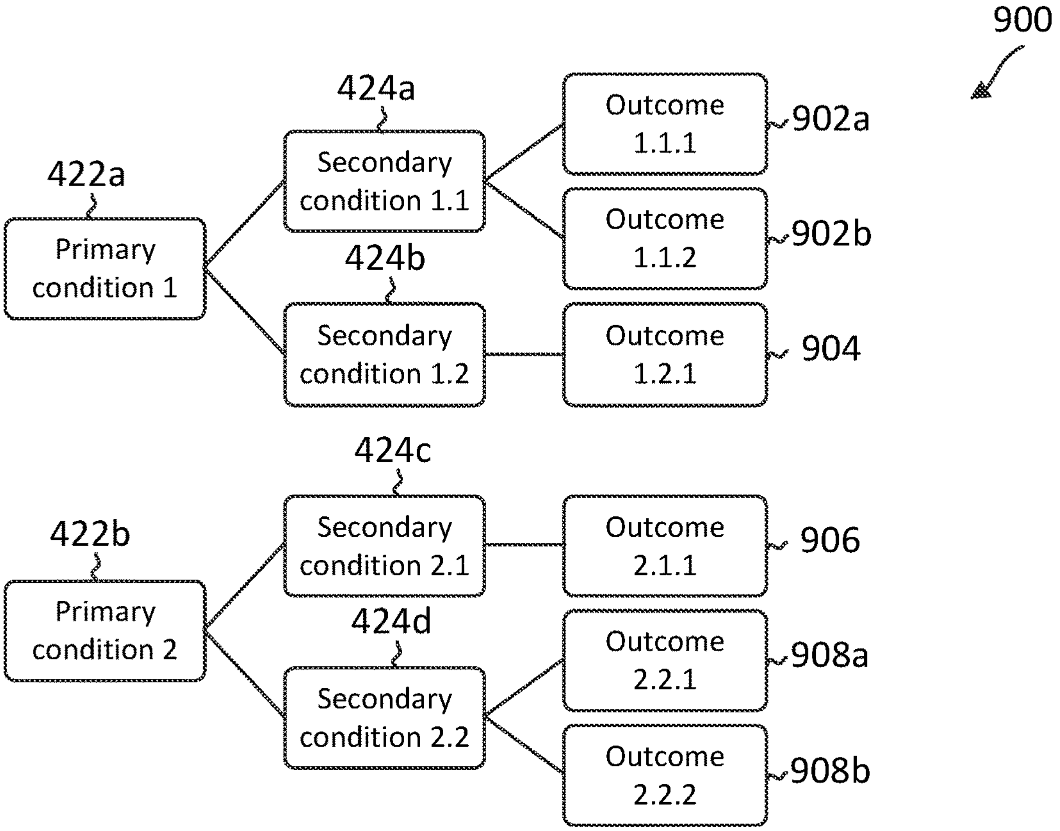
FIG. 9 illustrates a hierarchical channel access scheme according to some aspects of the present disclosure.
Figure 10:
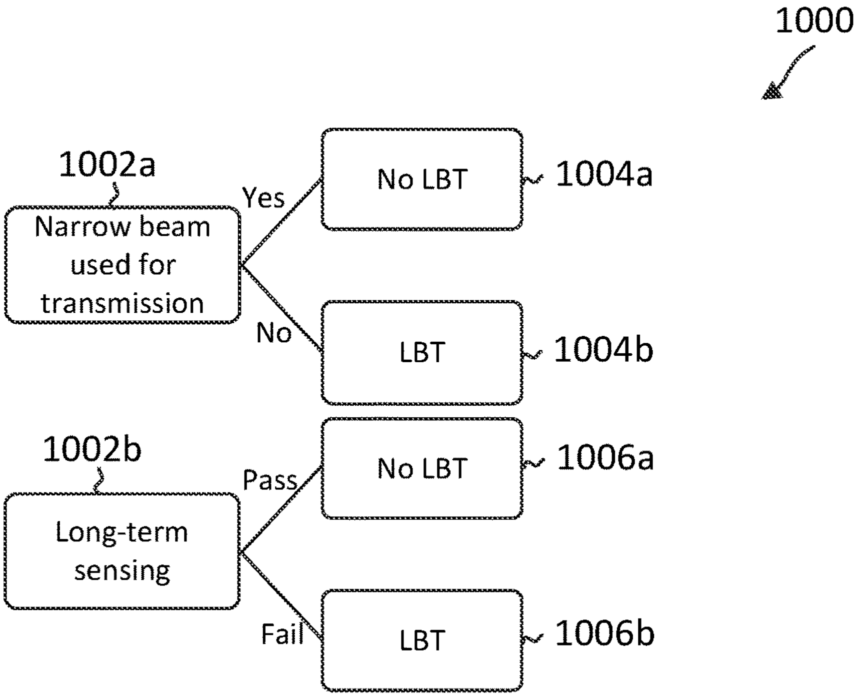
FIG. 10 illustrates a hierarchical channel access scheme according to some aspects of the present disclosure.
Figure 11:
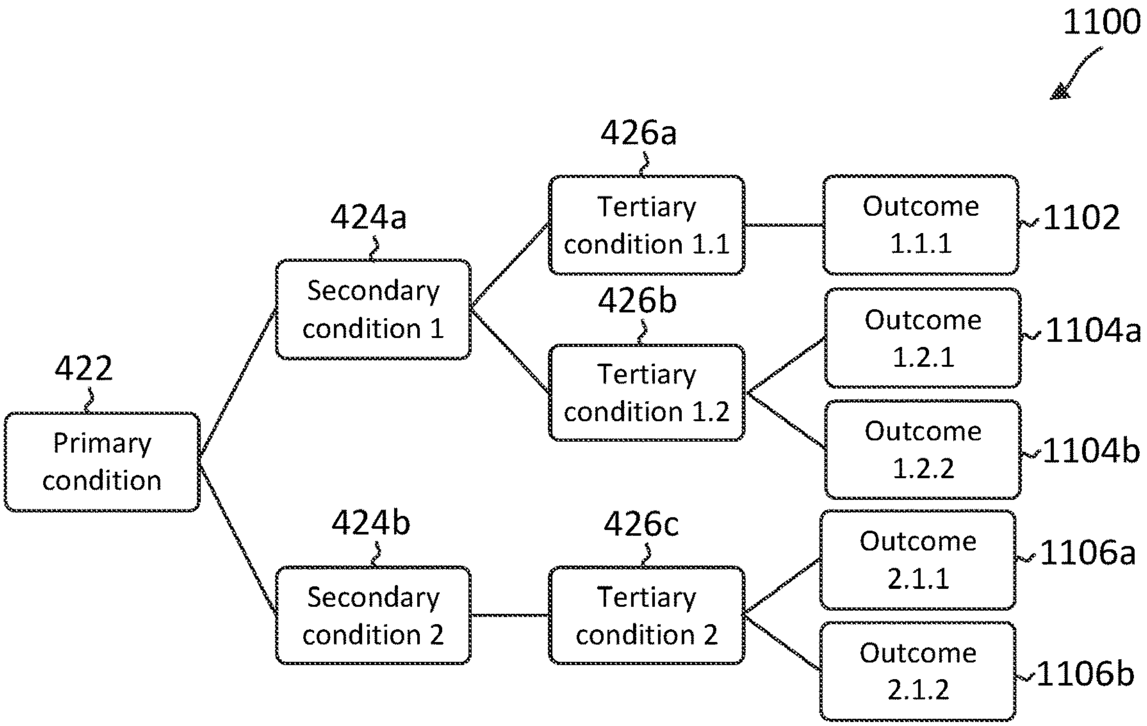
FIG. 11 illustrates a hierarchical channel access scheme according to some aspects of the present disclosure.
Figure 12:
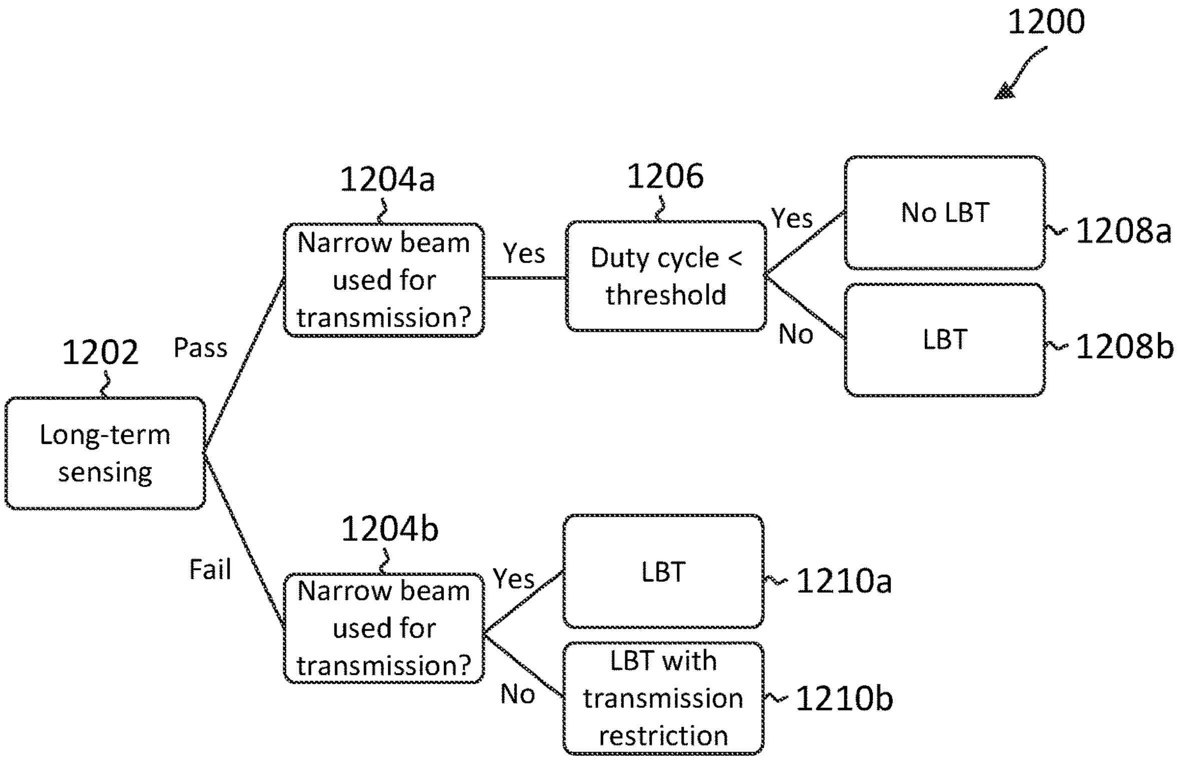
FIG. 12 illustrates a hierarchical channel access scheme according to some aspects of the present disclosure.

FIGS. 5-7, 8A-8F, and 9-12 illustrate various channel access schemes with a hierarchy composing from one or more primary channel access conditions 422, one or more secondary channel access conditions 424, and/or one or more tertiary channel access conditions 426. FIGS. 5-7, 8A-8F, and 9-12 are discussed in relation to FIG. 4 to illustrate using a combination of channel access conditions. FIGS. 5-6 illustrate channel access schemes utilizing a single level frame with a primary channel access condition 422. FIGS. 7 and 8A-8F illustrate channel access schemes utilizing a two-level framework with a primary channel access condition 422 and one or more secondary channel access conditions 424. FIGS. 9 and 10 illustrate channel access schemes also utilizing a two-level framework, but with two primary channel access conditions 422 and one or more secondary channel access conditions 424. FIGS. 11 and 12 illustrate channel access schemes utilizing a three-level framework with a primary channel access condition 422, one or more secondary channel access conditions 424, and one or more tertiary channel access conditions 426.

FIG. 5 illustrates a hierarchical channel access scheme according to some aspects of the present disclosure. The scheme 500 may be employed by BSs such as the BSs 105 and/or 205 and/or UEs such as the UEs 115 and/or 215. In particular, a wireless communication device (e.g., a BS or a UE) may perform channel access in an unlicensed band, for example, in a 20 GHz, 40 GHz, 60 GHz or higher frequency range, as shown in the scheme 500. The scheme 500 illustrates a one-level channel access framework using mechanisms from the scheme 400.

In the scheme 500, a wireless communication device (e.g., a BS 105, 205 or a UE 115, 215) determines whether a primary channel access condition 422 is satisfied. If the primary channel access condition 422 is satisfied, the wireless communication device performs a channel access procedure based on outcome 1 (shown as 502*a*), which may be a set of channel access rules S1. Conversely, if the primary channel access condition 422 in not satisfied, the wireless communication device performs a channel access procedure based on outcome 2 (shown as 502*b*).

In some aspects, the primary channel access condition 422 may be selected from the channel access condition options 410, 412, 414, 416, and/or 418 discussed above with reference to FIG. 4. However, other channel access condition options are also contemplated.

In some aspects, the outcome 502*a* may include a set of channel access rules S1 when the primary channel access condition 422 is satisfied, and the outcome 502*a* may include another set of access rules S2 that are more stringent than S1 when the primary channel access condition 422 is not satisfied. In some aspects, the S1 rules and/or the S2 rules may be selected from the channel access procedure options 460, 462, 464, 466, 468, and/or 470 discussed above with reference to FIG. 4. However, other channel access procedure options are also contemplated.

FIG. 6 illustrates a hierarchical channel access scheme 600 according to some aspects of the present disclosure. The scheme 600 may be employed by BSs such as the BSs 105 and/or 205 and/or UEs such as the UEs 115 and/or 215. In particular, a wireless communication device (e.g., a BS or a UE) may perform channel access in an unlicensed band, for example, in a 20 GHz, 40 GHz, 60 GHz or higher frequency range, as shown in the scheme 600. The scheme 600 provides an illustrative example for channel access using the framework shown by the scheme 500.

As shown in FIG. 6, a wireless communication device (e.g., a BS 105, 205 or a UE 115, 215) configures a primary channel access condition 602 based on the narrow beam option 412 and determines whether a narrow beam is to be used for transmitting a communication or not. As discussed above, the wireless communication device may determine whether a narrow beam transmission is used based on whether an antenna gain (to be used for the transmission) satisfies a threshold (e.g., greater than X dB), whether a difference between a transmit power and a EIRP (to be used for the transmission) satisfies a threshold (e.g., greater than Y dB), or whether a beam width of a transmission beam (to be used for the transmission) satisfies a threshold (e.g., smaller than Z degree(s)).

If the wireless communication device determines that a narrow beam is to be used for transmitting the communication signal, the primary channel access condition 602 is satisfied, and the wireless communication device may transmit the communication signal in the unlicensed band without performing an LBT as shown by outcome 604*a*. Conversely, if the wireless communication device determines that a narrow beam is not to be used for transmitting the communication signal, the primary channel access condition 602 is not satisfied, and the wireless communication device may perform an LBT prior to transmitting the communication signal in the unlicensed band and may proceed with the transmission upon passing the LBT as shown by outcome 606*b*.

While FIG. 6 illustrates the primary channel access condition 602 based on whether a narrow beam is used for transmission and the outcomes 604*a* and 606*b* related to LBT, aspects are not limited thereto. To that end, the primary channel access condition 602 may be selected from any suitable channel access conditions such as the channel access condition options 410, 412, 414, 416, and/or 418. Further, the outcomes 602 and 604*a* may be selected from any suitable channel access procedures such as the channel access procedure options 460, 462, 464, 466, 468, and/or 470. Moreover, the narrow beam transmission condition and LBT-based channel access are exemplary and not limiting.

Figure 7:
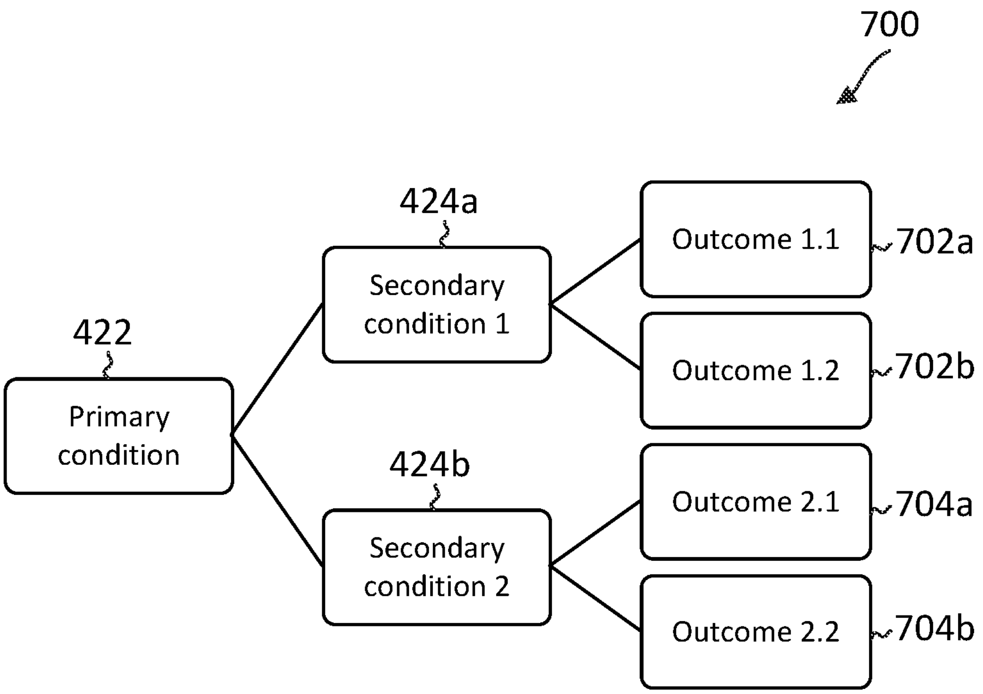
FIG. 7 illustrates a hierarchical channel access scheme according to some aspects of the present disclosure.

FIG. 7 illustrates a hierarchical channel access scheme 700 according to some aspects of the present disclosure. The scheme 700 may be employed by BSs such as the BSs 105 and/or 205 and/or UEs such as the UEs 115 and/or 215. In particular, a wireless communication device (e.g., a BS or a UE) may perform channel access in an unlicensed band, for example, in a 20 GHz, 40 GHz, 60 GHz or higher frequency range, as shown in the scheme 700. The scheme 700 illustrates a two-level channel access framework using mechanisms from the scheme 400.

In the scheme 700, a wireless communication device (e.g., a BS 105, 205 or a UE 115, 215) determines whether a primary channel access condition 422 and selects a secondary channel access condition 424*a* or 424*b* based on an outcome of the primary channel access condition 422. If the primary channel access condition 422 is satisfied, the wireless communication device further determines whether a secondary channel access condition 1 (shown as 424*a*) is satisfied. Conversely, if the primary channel access condition 422 is not satisfied, the wireless communication device may further determine whether a secondary channel access condition 2 (shown as 424*b*) is satisfied.

For the secondary channel access condition 424*a*, if the wireless communication device determines that the secondary channel access condition 424*a* is satisfied, the wireless communication device may perform a channel access procedure based on outcome 1.1 (shown as 702*a*). Conversely, if the secondary channel access condition 424*a* is not satisfied, the wireless communication device may perform a channel access procedure based on outcome 1.2 (shown as 702*b*).

For the secondary channel access condition 424*b*, if the wireless communication device determines that the secondary channel access condition 424*b* is satisfied, the wireless communication device may perform a channel access procedure based on outcome 2.1 (shown as 704*a*). Conversely, if the secondary channel access condition 424*b* in not satisfied, the wireless communication device may perform a channel access procedure based on outcome 2.2 (shown as 704*b*).

In some aspects, the primary channel access condition 422 and/or the secondary channel access conditions 424*a* and 424*b* may be selected from the channel access condition options 410, 412, 414, 416, and/or 418 discussed above with reference to FIG. 4. However, other channel access conditions options are also contemplated. In some aspects, the outcomes 702*a*, 702*b*, 704*a*, and 704*b* may be selected from the channel access procedure options 460, 462, 464, 466, 468, and/or 470 discussed above with reference to FIG. 4. However, other channel access procedure options are also contemplated.

Figure 8A:
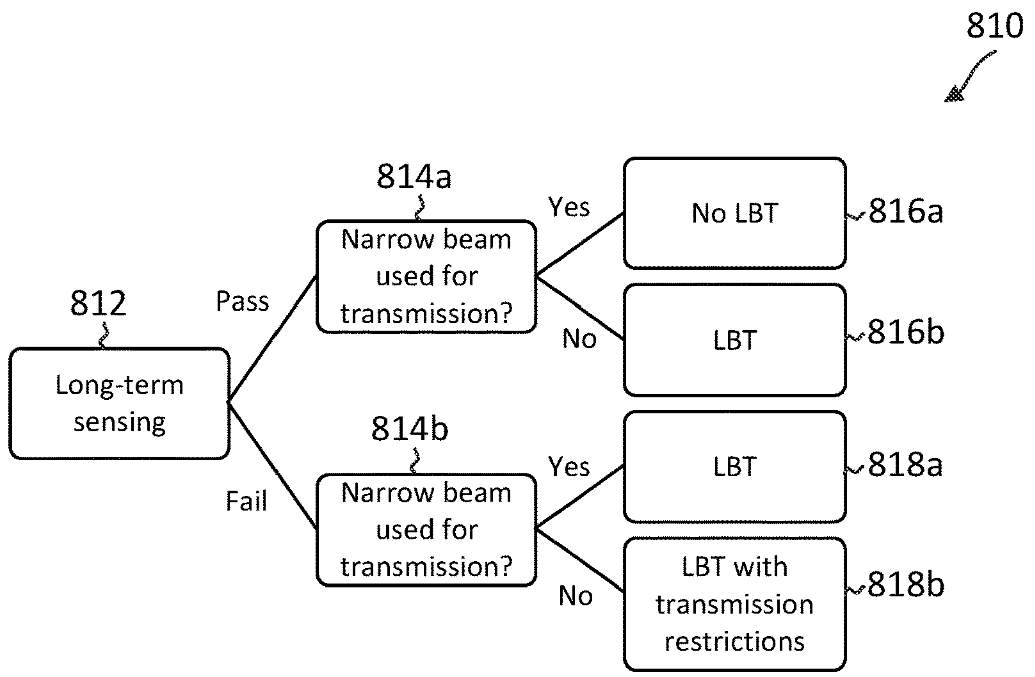
FIGS. 8A-8F illustrate hierarchical channel access schemes according to some aspects of the present disclosure.
Figure 8B:
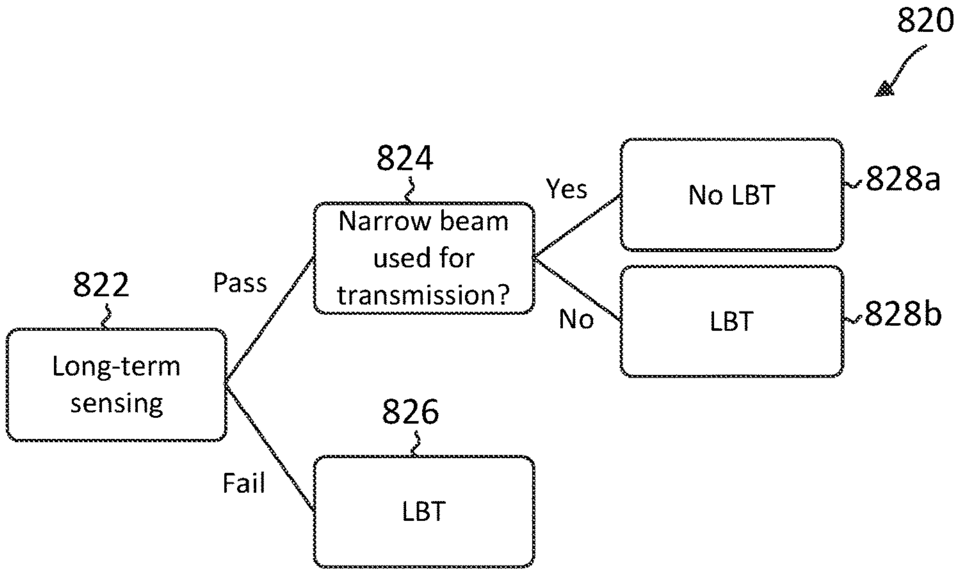
Figure 8C:
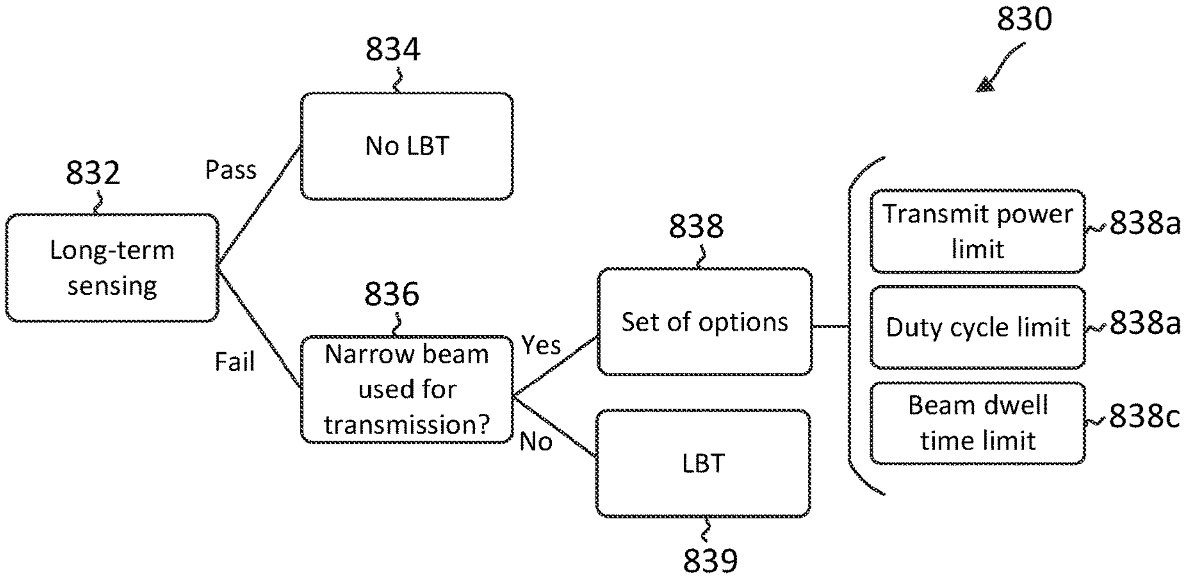
Figure 8D:
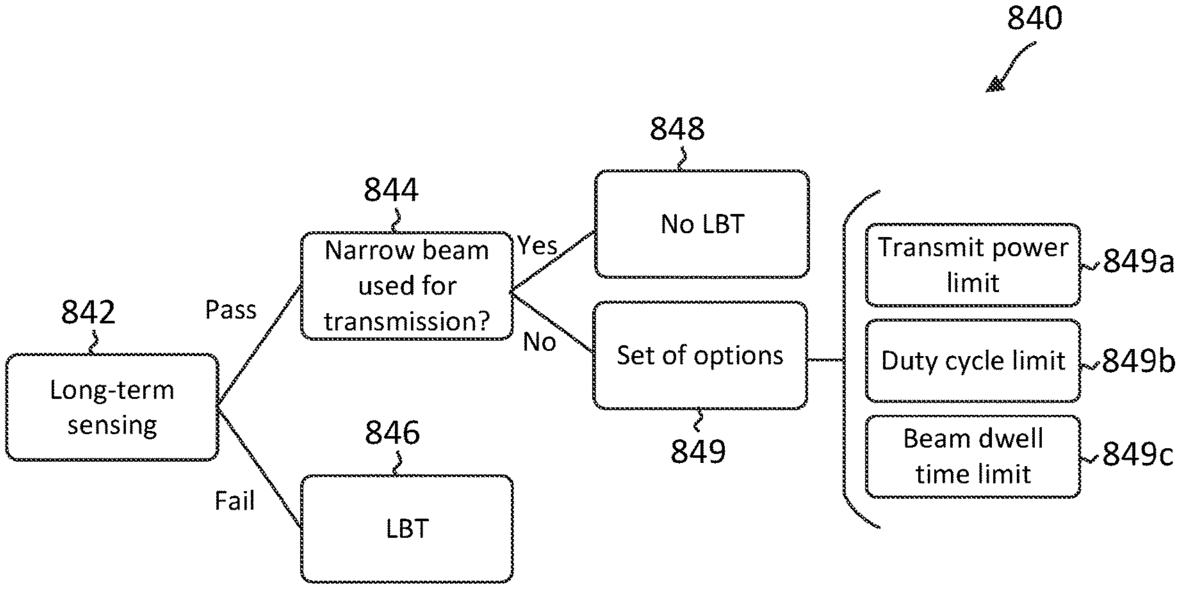
Figure 8E:
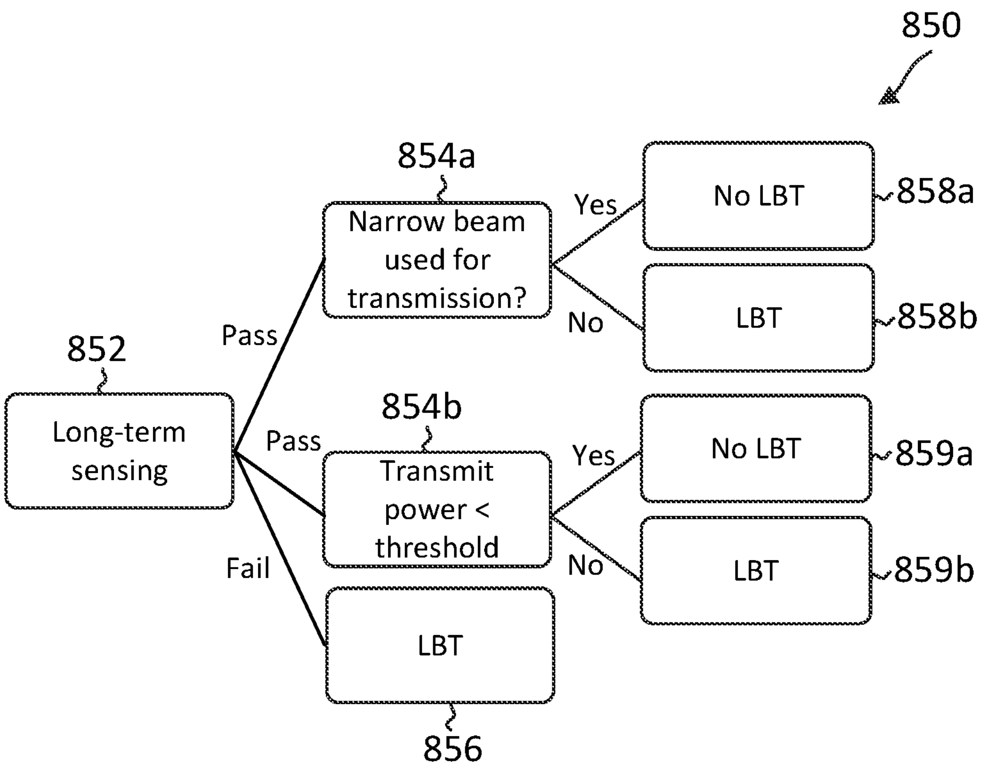
Figure 8F:
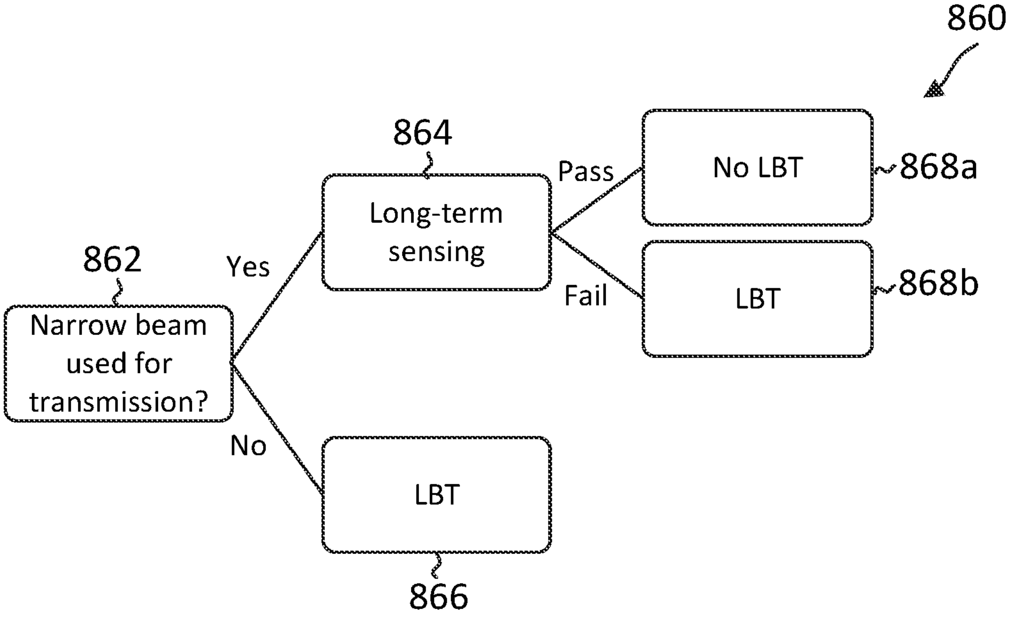

FIGS. 8A-8F illustrate various illustrative examples for channel access using the framework shown by the scheme 700. FIG. 8A illustrates a hierarchical channel access scheme 810 according to some aspects of the present disclosure. FIG. 8B illustrates a hierarchical channel access scheme 820 according to some aspects of the present disclosure. FIG. 8C illustrates a hierarchical channel access scheme 830 according to some aspects of the present disclosure. FIG. 8D illustrates a hierarchical channel access scheme 840 according to some aspects of the present disclosure. FIG. 8E illustrates a hierarchical channel access scheme 850 according to some aspects of the present disclosure. FIG. 8F illustrates a hierarchical channel access scheme 860 according to some aspects of the present disclosure. The schemes 810, 820, 830, 840, 850, and/or 860 may be employed by BSs such as the BSs 105 and/or 205 and/or UEs such as the UEs 115 and/or 215. In particular, a wireless communication device (e.g., a BS or a UE) may perform channel access in an unlicensed band, for example, in a 20 GHz, 40 GHz, 60 GHz or higher frequency range, as shown in the schemes 810, 820, 830, 840, 850, and/or 860.

Referring to FIG. 8A, a wireless communication device (e.g., a BS 105, 205 or a UE 115, 215) configures a primary channel access condition 812 based on the long-term sensing option 410, performs long-term sensing (e.g., using the scheme 300), and determines whether long-term sensing is a pass or a failure. As discussed above, the wireless communication device may determine whether a channel measurement or a measurement metric from the long-term sensing satisfies a threshold.

If the wireless communication device determines that a channel measurement from the long-term sensing is below the channel measurement threshold (e.g., indicating no strong interferer nearby the device), the primary channel access condition 812 is satisfied (e.g., pass). Conversely, if the wireless communication device determines that the channel measurement from the long-term sensing exceeds the channel measurement threshold (e.g., indicating strong interferer nearby the device), the primary channel access condition 812 is not satisfied (e.g., fail).

The wireless communication device selects the narrow beam option 412 for the secondary channel access condition 814*a* if the primary channel access condition 812 is satisfied. The wireless communication device may also select the narrow beam option 412 for the secondary channel access condition 814*b* if the primary channel access condition 812 is not satisfied. As discussed above, the wireless communication device may determine whether a narrow beam transmission is used based on whether an antenna gain (to be used for the transmission) satisfies a threshold (e.g., greater than X dB), whether a difference between a transmit power and a EIRP (to be used for the transmission) satisfies a threshold (e.g., greater than Y dB), or whether a beam width of a transmission beam (to be used for the transmission) satisfies a threshold (e.g., smaller than Z degree(s)).

For the secondary channel access condition 814*a*, if the wireless communication device determines that a narrow beam is to be used for transmitting the communication signal, the secondary channel access condition 814*a* is satisfied, and the wireless communication device may transmit the communication signal in the unlicensed band without performing an LBT as shown by outcome 816*a*. Conversely, if the wireless communication device determines that a narrow beam is not to be used for transmitting the communication signal, the secondary channel access condition 814*a* is not satisfied, and the wireless communication device may perform an LBT prior to transmitting the communication signal in the unlicensed band and may proceed with the transmission upon passing the LBT as shown by outcome 816*b*.

For the secondary channel access condition 814*b*, if the wireless communication device determines that a narrow beam is to be used for transmitting the communication signal, the secondary channel access condition 814*b* is satisfied, and the wireless communication device may perform an LBT prior to transmitting the communication signal in the unlicensed band and may proceed with the transmission upon passing the LBT as shown by outcome 818*a*. Conversely, if the wireless communication device determines that a narrow beam is not to be used for transmitting the communication signal, the secondary channel access condition 814*b* is not satisfied, and the wireless communication device may perform an LBT prior to transmitting the communication signal in the unlicensed band. Upon passing the LBT, the wireless communication device may transmit the communication signal with restriction(s) to the transmission parameter(s) (e.g., restricting a transmit power, a transmission duty cycle, and/or a beam dwell time) as shown by outcome 818*b*.

Referring to FIG. 8B, a wireless communication device (e.g., a BS 105, 205 or a UE 115, 215) configures a primary channel access condition 822 based on the long-term sensing option 410, performs long-term sensing (e.g., using the scheme 300), and determines whether long-term sensing is a pass or a failure. As discussed above, the wireless communication device may determine whether a channel measurement or a measurement metric from the long-term sensing satisfies a threshold.

If the wireless communication device determines that a channel measurement from the long-term sensing is below the channel measurement threshold (e.g., indicating no strong interferer nearby the device), the primary channel access condition 822 is satisfied (e.g., pass). Conversely, if the wireless communication device determines that the channel measurement from the long-term sensing exceeds the channel measurement threshold (e.g., indicating strong interferer nearby the device), the primary channel access condition 822 is not satisfied (e.g., fail).

If the primary channel access condition 822 is not satisfied, the wireless communication device may perform an LBT prior to transmitting a communication signal in the unlicensed band as shown by the outcome 826. Conversely, if the primary channel access condition 822 is satisfied, the wireless communication device further determines whether a narrow beam is to be used for transmitting a communication signal in the unlicensed band as shown by the secondary channel access condition 824. As discussed above, the wireless communication device may determine whether a narrow beam transmission is used based on whether an antenna gain (to be used for the transmission) satisfies a threshold (e.g., greater than X dB), whether a difference between a transmit power and a EIRP (to be used for the transmission) satisfies a threshold (e.g., greater than Y dB), or whether a beam width of a transmission beam (to be used for the transmission) satisfies a threshold (e.g., smaller than Z degree(s)).

For the secondary channel access condition 824, if the wireless communication device determines that a narrow beam is to be used for transmitting the communication signal, the secondary channel access condition 824 is satisfied, and the wireless communication device may transmit the communication signal in the unlicensed band without performing an LBT as shown by outcome **828*a*. Conversely, if the wireless communication device determines that a narrow beam is not to be used for transmitting the communication signal, the secondary channel access condition 824 is not satisfied, and the wireless communication device may perform an LBT prior to transmitting the communication signal in the unlicensed band and may proceed with the transmission upon passing the LBT as shown by outcome 828*b***.

Referring to FIG. 8C, a wireless communication device (e.g., a BS 105, 205 or a UE 115, 215) configures a primary channel access condition 832 based on the long-term sensing option 410, performs long-term sensing (e.g., using the scheme 300), and determines whether long-term sensing is a pass or a failure. As discussed above, the wireless communication device may determine whether a channel measurement or a measurement metric from the long-term sensing satisfies a threshold.

If the wireless communication device determines that a channel measurement from the long-term sensing is below the channel measurement threshold (e.g., indicating no strong interferer nearby the device), the primary channel access condition 832 is satisfied (e.g., pass). Conversely, if the wireless communication device determines that the channel measurement from the long-term sensing exceeds the channel measurement threshold (e.g., indicating strong interferer nearby the device), the primary channel access condition 832 is not satisfied (e.g., fail).

If the primary channel access condition 832 is satisfied, the wireless communication device may perform an LBT prior to transmitting a communication signal in the unlicensed band as shown by the outcome 834. Conversely, if the primary channel access condition 832 is not satisfied, the wireless communication device further determines whether a narrow beam is to be used for transmitting a communication signal in the unlicensed band as shown by the secondary channel access condition 836. As discussed above, the wireless communication device may determine whether a narrow beam transmission is used based on whether an antenna gain (to be used for the transmission) satisfies a threshold (e.g., greater than X dB), whether a difference between a transmit power and a EIRP (to be used for the transmission) satisfies a threshold (e.g., greater than Y dB), or whether a beam width of a transmission beam (to be used for the transmission) satisfies a threshold (e.g., smaller than Z degree(s)).

For the secondary channel access condition 836, if the wireless communication device determines that a narrow beam is to be used for transmitting the communication signal, the secondary channel access condition 836 is satisfied, and the wireless communication device further selects one or more options from the set of options 838 to restrict the transmission so that interference may be mitigated or a beam collision likelihood may be reduced. The wireless communication device may transmit the transmission without an LBT. As shown, the options **838*a* limits a transmit power (e.g., <P dBm) for the transmission, the options 838*b* limits a transmission duty cycle (e.g., <Q % of total time), and the option 838*c* limits beam dwell time (e.g., <B ms) for the transmission. The wireless communication device may apply the options 838*a*, 838*b*, and 838*c* using similar mechanism as the options 466, 468, and 470, respectively, as discussed above with reference to FIG. 4. Conversely, if the wireless communication device determines that a narrow beam is not to be used for transmitting the communication signal, the secondary channel access condition 836 is not satisfied, and the wireless communication device may perform an LBT prior to transmitting the communication signal in the unlicensed band and may proceed with the transmission upon passing the LBT as shown by outcome 839**.

Referring to FIG. 8D, a wireless communication device (e.g., a BS 105, 205 or a UE 115, 215) configures a primary channel access condition 842 based on the long-term sensing option 410, performs long-term sensing (e.g., using the scheme 300), and determines whether long-term sensing is a pass or a failure. As discussed above, the wireless communication device may determine whether a channel measurement or a measurement metric from the long-term sensing satisfies a threshold.

If the wireless communication device determines that a channel measurement from the long-term sensing is below the channel measurement threshold (e.g., indicating no strong interferer nearby the device), the primary channel access condition 842 is satisfied (e.g., pass). Conversely, if the wireless communication device determines that the channel measurement from the long-term sensing exceeds the channel measurement threshold (e.g., indicating strong interferer nearby the device), the primary channel access condition 842 is not satisfied (e.g., fail).

If the primary channel access condition 842 is not satisfied, the wireless communication device may perform an LBT prior to transmitting a communication signal in the unlicensed band as shown by the outcome 846. Conversely, if the primary channel access condition 842 is satisfied, the wireless communication device further determines whether a narrow beam is to be used for transmitting a communication signal in the unlicensed band as shown by the secondary channel access condition 844. As discussed above, the wireless communication device may determine whether a narrow beam transmission is used based on whether an antenna gain (to be used for the transmission) satisfies a threshold (e.g., greater than X dB), whether a difference between a transmit power and a EIRP (to be used for the transmission) satisfies a threshold (e.g., greater than Y dB), or whether a beam width of a transmission beam (to be used for the transmission) satisfies a threshold (e.g., smaller than Z degree(s)).

For the secondary channel access condition 844, if the wireless communication device determines that a narrow beam is to be used for transmitting the communication signal, the secondary channel access condition 844 is satisfied, and the wireless communication device may transmit the communication signal in the unlicensed band without performing an LBT as shown by outcome 848. Conversely, if the wireless communication device determines that a narrow beam is not to be used for transmitting the communication signal, the secondary channel access condition 844 is not satisfied, and the wireless communication device and the wireless communication device further selects one or more options from the set of options 849 to restrict the transmission so that interference may be mitigated or a beam collision likelihood may be reduced. The wireless communication device may transmit the transmission without an LBT. As shown, the options 849*a* limits a transmit power (e.g., <P dBm) for the transmission, the options 849*b* limits a transmission duty cycle (e.g., <D % of total time), and the option 849*c* limits beam dwell time (e.g., <B ms) for the transmission. The wireless communication device may apply the options 849*a*, 849*b*, and 849*c* using similar mechanism as the options 466, 468, and 470, respectively, as discussed above with reference to FIG. 4.

Referring to FIG. 8E, a wireless communication device (e.g., a BS 105, 205 or a UE 115, 215) configures a primary channel access condition 852 based on the long-term sensing option 410, performs long-term sensing (e.g., using the scheme 300), and determines whether long-term sensing is a pass or a failure. As discussed above, the wireless communication device may determine whether a channel measurement or a measurement metric from the long-term sensing satisfies a threshold.

If the wireless communication device determines that a channel measurement from the long-term sensing is below the channel measurement threshold (e.g., indicating no strong interferer nearby the device), the primary channel access condition 852 is satisfied (e.g., pass). Conversely, if the wireless communication device determines that the channel measurement from the long-term sensing exceeds the channel measurement threshold (e.g., indicating strong interferer nearby the device), the primary channel access condition 852 is not satisfied (e.g., fail).

If the primary channel access condition 852 is not satisfied, the wireless communication device may perform an LBT prior to transmitting a communication signal in the unlicensed band as shown by the outcome 856. Conversely, if the primary channel access condition 852 is satisfied, the wireless communication device further selects a secondary channel access condition. As shown, the wireless communication device may select between a narrow beam option 412 (shown as a secondary channel access condition 854*a*) or a transmit power option 414 (shown as secondary channel access condition 854*b*).

If the wireless communication device selects the secondary channel access condition 854*a*, the wireless communication device determines whether a narrow beam is to be used for transmitting a communication signal in the unlicensed band. As discussed above, the wireless communication device may determine whether a narrow beam transmission is used based on whether an antenna gain (to be used for the transmission) satisfies a threshold (e.g., greater than X dB), whether a difference between a transmit power and a EIRP (to be used for the transmission) satisfies a threshold (e.g., greater than Y dB), or whether a beam width of a transmission beam (to be used for the transmission) satisfies a threshold (e.g., smaller than Z degree(s)). If the wireless communication device determines that a narrow beam is to be used for transmitting the communication signal, the secondary channel access condition 854*a* is satisfied, and the wireless communication device may transmit the communication signal in the unlicensed band without performing an LBT as shown by outcome 858*a*. Conversely, if the wireless communication device determines that a narrow beam is not to be used for transmitting the communication signal, the secondary channel access condition 854*a* is not satisfied, and the wireless communication device may perform an LBT prior to transmitting the communication signal in the unlicensed band and may proceed with the transmission upon passing the LBT as shown by outcome 858*b*.

If the wireless communication device selects the secondary channel access condition 854*b*, the wireless communication device determines whether a transmit power to be used for an upcoming transmission (e.g., where the channel access is to be performed for) satisfies a transmit power threshold (e.g., <P dBm). If the wireless communication device determines that the transmit power to be used for the transmission is less than the transmit power threshold, the secondary channel access condition 854*b* is satisfied, and the wireless communication device may transmit the communication signal in the unlicensed band without performing an LBT as shown by outcome 859*a*. Conversely, if the wireless communication device determines that the transmit power to be used for the transmission is greater than the transmit power threshold, the secondary channel access condition 854*b* is not satisfied, and the wireless communication device may perform an LBT prior to transmitting the communication signal in the unlicensed band and may proceed with the transmission upon passing the LBT as shown by outcome 859*b*.

Referring to FIG. 8F, a wireless communication device (e.g., a BS 105, 205 or a UE 115, 215) configures a primary channel access condition 862 based on the narrow beam option 412 and determines whether a narrow beam is to be used for transmitting a communication or not. As discussed above, the wireless communication device may determine whether a narrow beam transmission is used based on whether an antenna gain (to be used for the transmission) satisfies a threshold (e.g., greater than X dB), whether a difference between a transmit power and a EIRP (to be used for the transmission) satisfies a threshold (e.g., greater than Y dB), or whether a beam width of a transmission beam (to be used for the transmission) satisfies a threshold (e.g., smaller than Z degree(s)).

If the primary channel access condition 862 is not satisfied, the wireless communication device may perform an LBT prior to transmitting a communication signal in the unlicensed band as shown by the outcome 866. Conversely, if the primary channel access condition 862 is satisfied, the wireless communication device further determines whether a narrow beam is to be used for transmitting a communication signal in the unlicensed band as shown by the secondary channel access condition 864.

For the secondary channel access condition 864, the wireless communication device determines whether long-term sensing is a pass or a failure. As discussed above, the wireless communication device may determine whether a channel measurement or a measurement metric from the long-term sensing satisfies a threshold.

If the wireless communication device determines that a channel measurement from the long-term sensing is below the channel measurement threshold (e.g., indicating no strong interferer nearby the device), the secondary channel access condition 864 is satisfied (e.g., pass), and the wireless communication device may transmit a communication signal in the unlicensed band without performing an LBT as shown by the outcome 868*a*. Conversely, if the wireless communication device determines that the channel measurement from the long-term sensing exceeds the channel measurement threshold (e.g., indicating strong interferer nearby the device), the secondary channel access condition 834 is not satisfied (e.g., fail), and the wireless communication device may perform an LBT prior to transmitting the communication signal in the unlicensed band and may proceed with the transmission upon passing the LBT as shown by outcome 868*b*.

As can be observed from the FIGS. 8A-8F, the wireless communication device may select a primary channel access condition and may further select one or more secondary channel access conditions (e.g., about 1, 2, 3, 4 or more) based on a result or outcome from assessing the primary channel access condition. The outcomes from assessing the primary and/or secondary channel access condition(s) can including performing an LBT, skipping an LBT, performing an LBT with additional restrictions (e.g., on a transmit power, a transmission duty cycle, and/or abeam dwell time), or skipping an LBT, but with additional restrictions (e.g., on a transmit power, a transmission duty cycle, and/or a beam dwell time). In general, a primary channel access condition and/or a secondary channel access condition may be selected from any suitable channel access conditions such as the channel access condition options 410, 412, 414, 416, and/or 418. Further, the outcomes from a primary channel access condition or a secondary channel access condition may be selected from any suitable channel access procedures such as the channel access procedure options 460, 462, 464, 466, 468, and/or 470. Moreover, the combinations of channel access conditions and channel access procedure outcomes shown in FIGS. 8A-8F are exemplary and not limiting.

FIG. 9 illustrates a hierarchical channel access scheme 900 according to some aspects of the present disclosure. The scheme 900 may be employed by BSs such as the BSs 105 and/or 205 and/or UEs such as the UEs 115 and/or 215. In particular, a wireless communication device (e.g., a BS or a UE) may perform channel access in an unlicensed band, for example, in a 20 GHz, 40 GHz, 60 GHz or higher frequency range, as shown in the scheme 900. The scheme 900 illustrates a two-level channel access framework using mechanisms from the scheme 400. The scheme 900 is similar to the scheme 700, but may provision for two primary channel access condition options. As shown, a wireless communication device (e.g., a BS 105, 205 or a UE 115, 215) may select between a primary channel access condition 422*a* and a primary channel access condition 422*b*.

In an aspect, the wireless communication device selects the primary channel access condition 422*a*, determines whether the primary channel access condition 422*a* is satisfied, and selects a secondary channel access condition 424*a* or 424*b* based on an outcome of the primary channel access condition 422*a*. If the primary channel access condition 422*a* is satisfied, the wireless communication device further determines whether a secondary channel access condition 1.1 (shown as 424*a*) is satisfied. Conversely, if the primary channel access condition 422*a* is not satisfied, the wireless communication device may further determine whether a secondary channel access condition 1.2 (shown as 424*b*) is satisfied.

For the secondary channel access condition 424*a*, if the wireless communication device determines that the secondary channel access condition 424*a* is satisfied, the wireless communication device may perform a channel access procedure based on outcome 1.1.1 (shown as 902*a*). Conversely, if the secondary channel access condition 424*a* is not satisfied, the wireless communication device may perform a channel access procedure based on outcome 1.1.2 (shown as 902*b*).

For the secondary channel access condition 424*b*, the wireless communication device may perform a channel access procedure based on outcome 1.2.1 (shown as 904), for example, if the secondary channel access condition 424*b* is satisfied. While not shown, there may be also be an outcome for a channel access procedure if the secondary channel access condition 424*b* is not satisfied. In general, each channel access condition may have one or more branches or outcomes if the channel access condition is satisfied or if the channel access condition is not satisfied.

In another aspect, the wireless communication device selects the primary channel access condition 422*b*, determines whether the primary channel access condition 422*b* is satisfied, and selects a secondary channel access condition 424*c* or 424*d* based on an outcome of the primary channel access condition 422*b*. If the primary channel access condition 422*b* is satisfied, the wireless communication device further determines whether a secondary channel access condition 2.1 (shown as 424*c*) is satisfied. Conversely, if the primary channel access condition 422*b* is not satisfied, the wireless communication device may further determine whether a secondary channel access condition 2.2 (shown as 424*d*) is satisfied.

For the secondary channel access condition 424*c*, the wireless communication device may perform a channel access procedure based on outcome 2.1.1 (shown as 906) if the secondary channel access condition 424*c* is satisfied. While not shown, there may be also be an outcome for a channel access procedure if the secondary channel access condition 424*c* is not satisfied. For the secondary channel access condition 424*d*, if the wireless communication device determines that the secondary channel access condition 424*d* is satisfied, the wireless communication device may perform a channel access procedure based on outcome 2.2.1 (shown as 908*a*). Conversely, if the secondary channel access condition 424*d* is not satisfied, the wireless communication device may perform a channel access procedure based on outcome 2.2.2 (shown as 908*b*).

In some aspects, the primary channel access conditions 422*a*, 422*b* and/or the secondary channel access conditions 424*a*, 424*b*, 424*c*, 424*d* may be selected from the channel access condition options 410, 412, 414, 416, and/or 418 discussed above with reference to FIG. 4. However, other channel access conditions options are also contemplated. In some aspects, the outcomes 902*a*, 902*b*, 904, 906, 908*a*, and 908*b* may be selected from the channel access procedure options 460, 462, 464, 466, 468, and/or 470 discussed above with reference to FIG. 4. However, other channel access procedure options are also contemplated.

FIG. 10 illustrates a hierarchical channel access scheme 1000 according to some aspects of the present disclosure. The scheme 1000 may be employed by BSs such as the BSs 105 and/or 205 and/or UEs such as the UEs 115 and/or 215. In particular, a wireless communication device (e.g., a BS or a UE) may perform channel access in an unlicensed band, for example, in a 20 GHz, 40 GHz, 60 GHz or higher frequency range, as shown in the scheme 1000. The scheme

1000 provides an illustrative example for channel access using the framework shown by the scheme 900.

As shown in FIG. 10, a wireless communication device (e.g., a BS 105, 205 or a UE 115, 215) may select between a primary channel access condition 1002*a* based on a narrow beam option 412 or a primary channel access condition 1002*b* based on a long-term sensing option 410. For simplicity, FIG. 10 illustrates multiple primary channel access conditions without further selection on secondary channel access condition(s).

In an aspect, the wireless communication device selects the primary channel access condition 1002*a* based on whether a narrow beam is to be used for transmitting a communication signal in an unlicensed band. As discussed above, the wireless communication device may determine whether a narrow beam transmission is used based on whether an antenna gain (to be used for the transmission) satisfies a threshold (e.g., greater than X dB), whether a difference between a transmit power and a EIRP (to be used for the transmission) satisfies a threshold (e.g., greater than Y dB), or whether a beam width of a transmission beam (to be used for the transmission) satisfies a threshold (e.g., smaller than Z degree(s)). If the primary channel access condition 1002*a* is satisfied, the wireless communication device may transmit a communication signal in the unlicensed band without perform an LBT as shown by the outcome 1004*a*. Conversely, if the primary channel access condition 1002*a* is not satisfied, the wireless communication device may perform an LBT prior to transmitting a communication signal in the unlicensed band as shown by the outcome 1004*b*.

In an aspect, the wireless communication device selects the primary channel access condition 1002*b* based on whether a channel measurement or a measurement metric from long-term sensing (e.g., performed using the scheme 300) satisfies a threshold. If the primary channel access condition 1002*b* is satisfied, the wireless communication device may transmit a communication signal in the unlicensed band without perform an LBT as shown by the outcome 1006*a*. Conversely, if the primary channel access condition 1002*b* is not satisfied, the wireless communication device may perform an LBT prior to transmitting a communication signal in the unlicensed band as shown by the outcome 1006*b*.

While FIG. 10 illustrates the primary channel access condition 1002*a* based on whether a narrow beam is used for transmission, the primary channel access condition 1002*b* based on whether a long-term sensing result passes or fails, and the outcomes 1004*a*, 1004*b*, 1006*a*, and 1006*b* related to LBT, aspects are not limited thereto. To that end, the primary channel access conditions 1002*a* and 1002*b* may be selected from any suitable channel access conditions such as the channel access condition options 410, 412, 414, 416, and/or 418. Further, the outcomes 1004*a*, 1004*b*, 1006*a*, and 1006*b* may be selected from any suitable channel access procedures such as the channel access procedure options 460, 462, 464, 466, 468, and/or 470. Moreover, the combination of channel access conditions and the channel access procedure outcomes shown in FIG. 10 are exemplary and not limiting.

FIG. 11 illustrates a hierarchical channel access scheme 1100 according to some aspects of the present disclosure. The scheme 1100 may be employed by BSs such as the BSs 105 and/or 205 and/or UEs such as the UEs 115 and/or 215. In particular, a wireless communication device (e.g., a BS or a UE) may perform channel access in an unlicensed band, for example, in a 20 GHz, 40 GHz, 60 GHz or higher frequency range, as shown in the scheme 1100. The scheme 1100 illustrates a three-level channel access framework using mechanisms from the scheme 400.

In the scheme 1100, a wireless communication device (e.g., a BS 105, 205 or a UE 115, 215) determines whether a primary channel access condition 422 and selects a secondary channel access condition 424*a* or 424*b* based on an outcome of the primary channel access condition 422. If the primary channel access condition 422 is satisfied, the wireless communication device further determines whether a secondary channel access condition 1 (shown as 424*a*) is satisfied. Conversely, if the primary channel access condition 422 is not satisfied, the wireless communication device may further determine whether a secondary channel access condition 2 (shown as 424*b*) is satisfied.

For the secondary channel access condition 424*a*, if the secondary channel access condition 424*a* is satisfied, the wireless communication device may further determine whether a tertiary channel access condition 1.1 (shown as 426*a*) is satisfied. Conversely, if the secondary channel access condition 424*a* is not satisfied, the wireless communication device may further determine whether a tertiary channel access condition 1.2 (shown as 426*b*) is satisfied.

For the tertiary channel access condition 426*a*, the wireless communication device may perform a channel access procedure based on outcome 1.2.1 (shown as 1002) irrespective of an assessment of the tertiary channel access condition 426*a*. In other words, the wireless communication device may perform a channel access procedure based on outcome 1.2.1 if the secondary channel access condition 424*a* is satisfied.

For the tertiary channel access condition 426*b*, if the wireless communication device determines that the tertiary channel access condition 426*b* is satisfied, the wireless communication device may perform a channel access procedure based on outcome 1.2.1 (shown as 1104*a*). Conversely, if the tertiary channel access condition 426*b* in not satisfied, the wireless communication device may perform a channel access procedure based on outcome 1.2.2 (shown as 1104*b*).

For the secondary channel access condition 424*b*, if the secondary channel access condition 424*b* is satisfied, the wireless communication device may determine whether a tertiary channel access condition 426*c* is satisfied. While not shown, there may be also be an outcome for a channel access procedure if the secondary channel access condition 424*b* is not satisfied. In general, each channel access condition may have one or more branches or outcomes if the channel access condition is satisfied or if the channel access condition is not satisfied.

For the tertiary channel access condition 426*c*, if the wireless communication device determines that the tertiary channel access condition 426*c* is satisfied, the wireless communication device may perform a channel access procedure based on outcome 2.1.1 (shown as 1106*a*). Conversely, if the tertiary channel access condition 426*c* in not satisfied, the wireless communication device may perform a channel access procedure based on outcome 2.1.2 (shown as 1106*b*).

In some aspects, the primary channel access condition 422, the secondary channel access conditions 424*a* and 424*b*, and/or the tertiary channel access conditions 426*a*, 426*b*, and 426*c* may be selected from the channel access condition options 410, 412, 414, 416, and/or 418 discussed above with reference to FIG. 4. However, other channel access conditions options are also contemplated. In some aspects, the outcomes 1102, 1104*a*, 1104*b*, 1106*a*, and 1106*b* may be selected from the channel access procedure options 460, 462, 464, 466, 468, and/or 470 discussed above with reference to FIG. 4. However, other channel access procedure options are also contemplated.

FIG. 12 illustrates a hierarchical channel access scheme 1200 according to some aspects of the present disclosure. The scheme 1200 may be employed by BSs such as the BSs 105 and/or 205 and/or UEs such as the UEs 115 and/or 215. In particular, a wireless communication device (e.g., a BS or a UE) may perform channel access in an unlicensed band, for example, in a 20 GHz, 40 GHz, 60 GHz or higher frequency range, as shown in the scheme 1200. The scheme 1200 provides an illustrative example for channel access using the framework shown by the scheme 1100.

In the scheme 1200, a wireless communication device (e.g., a BS 105, 205 or a UE 115, 215) configures a primary channel access condition 1202 based on the long-term sensing option 410, performs long-term sensing (e.g., using the scheme 300), and determines whether long-term sensing is a pass or a failure. As discussed above, the wireless communication device may determine whether a channel measurement or a measurement metric from the long-term sensing satisfies a threshold.

If the wireless communication device determines that a channel measurement from the long-term sensing is below the channel measurement threshold (e.g., indicating no strong interferer nearby the device), the primary channel access condition 1202 is satisfied (e.g., pass). Conversely, if the wireless communication device determines that the channel measurement from the long-term sensing exceeds the channel measurement threshold (e.g., indicating strong interferer nearby the device), the primary channel access condition 1202 is not satisfied (e.g., fail).

If the primary channel access condition 1202 is satisfied, the wireless communication device further determines whether a narrow beam is to be used for transmitting a communication signal in the unlicensed band (shown by the secondary channel access condition 1204*a*). If the primary channel access condition 1202 is not satisfied, the wireless communication device also determines whether a narrow beam is to be used for transmitting a communication signal in the unlicensed band (shown by the secondary channel access condition 1204*b*). As discussed above, the wireless communication device may determine whether a narrow beam transmission is used based on whether an antenna gain (to be used for the transmission) satisfies a threshold (e.g., greater than X dB), whether a difference between a transmit power and a EIRP (to be used for the transmission) satisfies a threshold (e.g., greater than Y dB), or whether a beam width of a transmission beam (to be used for the transmission) satisfies a threshold (e.g., smaller than Z degree(s)).

For the secondary channel access condition 1204*a*, if the wireless communication device determines that a narrow beam is to be used for transmitting the communication signal, the secondary channel access condition 1204*a* is satisfied, and the wireless communication device further determines whether a transmission duty cycle (either before or after transmitting the communication signal) satisfies a threshold (shown as a tertiary channel access condition 1206). If the secondary channel access condition 1204*a* is not satisfied, the wireless communication device may refrain from transmitting in the channel.

For the tertiary channel access condition 1206, if the wireless communication device determines that the transmission duty cycle satisfies the threshold, the tertiary channel access condition 1206 is satisfied, and the wireless communication device may transmit the communication signal in the unlicensed band without performing an LBT as shown by outcome 1208*a*. Conversely, if the wireless communication device determines that the transmission duty cycle fails to satisfy the threshold, tertiary channel access condition 1206 is not satisfied, and the wireless communication device may perform an LBT prior to transmitting the communication signal in the unlicensed band and may proceed with the transmission upon passing the LBT as shown by outcome 1208*b*.

For the secondary channel access condition 1204*b*, if the secondary channel access condition 1204*b* is satisfied, the wireless communication device may transmit a communication signal in the unlicensed band without perform an LBT as shown by the outcome 1210*a*. Conversely, if the secondary channel access condition 1204*b* is not satisfied, the wireless communication device may perform an LBT prior to transmitting a communication signal in the unlicensed band and may additionally apply restrictions to the transmission (e.g., restricting a transmit power, a transmission duty cycle, and/or a beam dwell time) as shown by the outcome 1210*b*.

While FIG. 12 illustrates the primary channel access condition 1202 based on whether a long-term sensing result passes or fails, the secondary channel access conditions 1204*a*, 1204*b* based on whether a narrow beam is used for transmission, the tertiary channel access conditions 1206, and the outcomes 1208*a*, 1208*b*, 1210*a*, 1210*b* related to LBT, aspects are not limited thereto. To that end, the primary channel access condition 1202, the secondary channel access conditions 1204*a*, 1204*b*, and the tertiary channel access condition 1206 may be selected from any suitable combination of channel access conditions such as the channel access condition options 410, 412, 414, 416, and/or 418. Further, the outcomes 1208*a*, 1208*b*, 1210*a*, 1210*b* may be selected from any suitable channel access procedures such as the options channel access procedure options 460, 462, 464, 466, 468, and/or 470. Moreover, the combination of channel access conditions and the channel access procedure outcomes shown in FIG. 12 are exemplary and not limiting.

While FIGS. 5, 7, 9, and 11 illustrate channel access frameworks up to three-levels (with primary, secondary, and tertiary channel access conditions) based on the scheme 400, the scheme 400 may be used to generate a channel access hierarchical framework with any suitable number of levels (e.g., 4 or more). Further, a channel access hierarchical framework may combine any suitable channel access conditions (e.g., based on options 410, 412, 414, 416, and/or 418) in any suitable order to utilize or optimize the strengths from each channel access condition and to avoid or minimize the weaknesses of each channel access condition. In general, a wireless communication device (e.g., a BS 105, 205, or a UE 115, 215) may traverse through each level of a channel access hierarchical framework by assessing a channel access condition at each level until arriving at an outcome for a channel access procedure. Furthermore, each channel access condition at each level traversed by the wireless communication device may include an assessment for a different one of at least one of sensing across multiple COTs (e.g., the long-term sensing option 410), a transmission beam characteristic (e.g., the narrow beam option 412), a transmit power (e.g., the transmit power option 414), a transmission duty cycle (e.g., the transmission duty cycle option 416), or beam dwell time (e.g., the beam dwell time option 418). For example, for a 2-level channel access condition hierarchy, a wireless communication device may traverse through a primary channel access condition and a secondary channel access condition based on an outcome of the primary channel access condition, where each of the primary channel access condition and the secondary channel access condition may be associated with a different one of at least one of sensing across multiple COTs, a transmission beam characteristic, a transmit power, a transmission duty cycle, or beam dwell time. In another example, for a 3-level channel access condition hierarchy, a wireless communication device may traverse through a primary channel access condition, a secondary channel access condition based on an outcome of the primary channel access condition, and a tertiary channel access condition based on an outcome of the secondary channel access condition. where each of the primary channel access condition, the secondary channel access condition, and the tertiary channel access condition may be associated with a different one of at least one of sensing across multiple COTs, a transmission beam characteristic, a transmit power, a transmission duty cycle, or beam dwell time.

In some aspects, when there are multiple primary channel access conditions to select from, for example, as shown in the scheme 900 and 1000, a wireless communication device (e.g., a BS 105, 205, or a UE 115, 215) or a deployment may perform the selection. Once selected, the selected primary channel access condition may be used at the wireless communication device or for the deployment. Similarly, when there are multiple paths (e.g., a channel access condition or a channel access procedure outcome) branching from a certain outcome of a primary channel access condition, a secondary channel access condition, or a tertiary channel access condition, a wireless communication device (e.g., a BS 105, 205, or a UE 115, 215) or a deployment may perform the selection. Once selected, the selected path may be used at the wireless communication device or for the deployment.

In other aspects, when there are multiple primary channel access conditions to select from, for example, as shown in the schemes 900 and 1000, a wireless communication device (e.g., a BS 105, 205, or a UE 115, 215), a wireless communication device (e.g., a BS 105, 205, or a UE 115, 215) perform the selection based on network parameter(s), channel quality, interference, and/or traffic types. In some examples, a parameter used for the selection may be related to a number of beams supported at the wireless communication device. For example, for a wireless communication device with a smaller number of beams (e.g., less than or equals 16), the wireless communication device may select a primary channel access condition 1 (e.g., the primary channel access condition 1002*a*). For a wireless communication device with a greater number of beams (e.g., 256 or more), the wireless communication device may select a primary channel access condition 2 (e.g., the primary channel access condition 1002*b*). Similarly, when there are multiple paths (e.g., a channel access condition or a channel access procedure outcome) branching from a certain outcome of a primary channel access condition, a secondary channel access condition, or a tertiary channel access condition, a wireless communication device (e.g., a BS 105, 205, or a UE 115, 215) may perform the selection based on network parameter(s), channel quality, interference, and/or traffic types.

As discussed above, a BS (e.g., a BS 105, 205) or a UE (e.g., a UE 115, 215) may be capable of generating multiple beams for transmission and/or reception. Different beams or beam directions may have different results for a channel access condition (e.g., a primary channel access condition 422, a secondary channel access condition 424, or a tertiary channel access condition 426), and thus may lead to different outcomes or different channel access procedures when using different beams. Accordingly, in some aspects, channel access condition(s) may be assessed on a per-beam basis as shown in FIG. 13.

Figure 13:
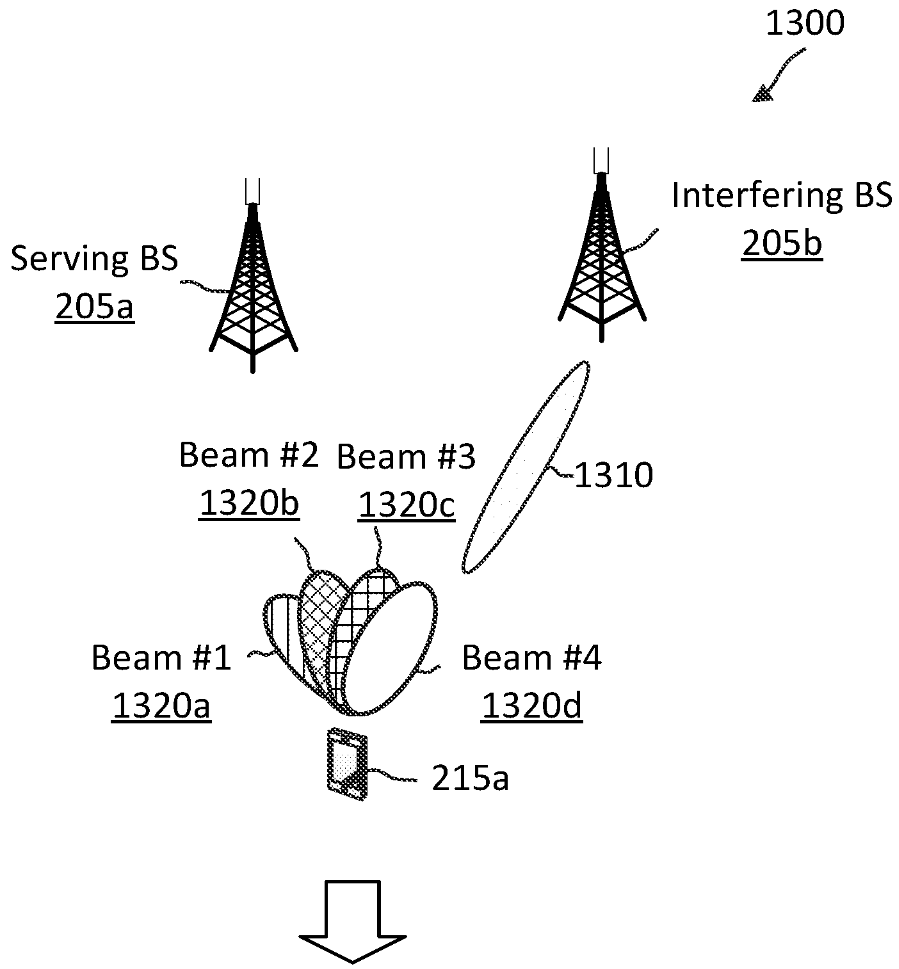
FIG. 13 illustrates a hierarchical, beam-specific channel access scheme according to some aspects of the present disclosure.

FIG. 13 illustrates a hierarchical, beam-specific channel access scenario 1300 according to some aspects of the present disclosure. The scenario 1300 may be employed by BSs such as the BSs 105 and/or 205 and/or UEs such as the UEs 115 and/or 215. The scenario 1300 may correspond to a channel access scenario in the network 100. The scenario 1300 provides an illustrative example with channel access condition(s) being applied on a per-beam basis. The scenario 1300 may use similar mechanism as discussed above with reference to FIGS. 4-7, 8A-8F, and 9-12.

In the scenario, a UE 215*a* is served by a BS 205*a* (a serving BS). The UE 215*a* may utilize multiple beams 1320 (shown as beam #1 1320*a*, beam #2 1320*b*, beam #3 1320*c*, and beam #4 1320*d*) for transmission and/or reception. For simplicity, FIG. 13 illustrates the UE 215*a* utilizing four beams 1320 shown as beam #1 1320*a*, beam #2 1320*b*, beam #3 1320*c*, and beam #4 1320*d*). However, the UE 215 may utilize a fewer number of beams (e.g., 2, 3) or a greater number of beams (e.g., 5, 6, 7, 8 or more). Further, a BS 205*b* may operate in the same area as the BS 205*a* and the UE 215*a*. The BS 205*a*, the BS 205*b*, and the UE 215*a* may operate over the same unlicensed band (e.g., in 20 GHz, 40 GHz, 60 GHz or higher frequency range). The BS 205*b* may transmit, for example, to a UE (not shown) served by the BS 205*b*, using a transmission beam 1310. As shown, the transmission beam 1310 can cause interference to the UE 215 if the UE 215*a* utilizes the beam #3 1320*c* and/or the beam #4 1320*d*.

The UE 215*a* may determine a channel access procedure for transmitting a communication signal in the unlicensed based on whether one or more channel access conditions (e.g., the channel access conditions 420) are satisfied or not.

Table 1330 illustrates a first scenario where the wireless communication device utilizes the long-term sensing option 410 as a primary channel access condition and may skip LBT if there is no strong interfere (with sensing channel measurements below a threshold). The wireless communication device may perform long-term sensing (e.g., using the scheme 300) using each beam 1320. The row 1332 illustrates long-term sensing results. As shown, the wireless communication device may determine that a channel energy measurement from long-term sensing using the beam #1 1320*a* is low (e.g., below am energy threshold) and may determine that a channel energy measurement from long-term sensing using the beam #2 1320*b* is also low (e.g., below the energy threshold). Further, the wireless communication device may determine that a channel energy measurement from long-term sensing using the beam #3 1320*c* is high (e.g., exceeds the energy threshold) and may determine that a channel energy measurement from long-term sensing using the beam #4 1320*d* is high (e.g., exceeds the energy threshold). The high energy measurements from the beam directions of beam #3 1320*c* and beam #4 1320*d* may be due to interference from the transmission beam 1310 generated by the BS 205*b*. Accordingly, if the wireless communication device uses the beam #1 1320*a* or the beam #2 1320*b* for transmission, the wireless communication device may transmit without performing an LBT. If, however, the wireless communication device uses the beam #3 1320*c* or the beam #4 1320*d* for transmission, the wireless communication device may perform an LBT and may proceed with the transmission upon an LBT pass.

Table 1340 illustrates a second scenario where the wireless communication device utilizes the narrow beam option 420 as a primary channel access condition and may skip LBT if using a narrow beam. The wireless communication device may determine an antenna gain for each beam 1320 if the beam 1320 is to be used for transmission. The row 1342 illustrates long-term sensing results. As shown, the wireless communication device may determine that an antenna gain for the beam #1 1320*a* and an antenna gain for the beam #2 1320*b* are high (satisfying an antenna gain threshold). Thus, the beam #1 1320*a* and the beam #2 1320*b* are narrow beams. The wireless communication device may determine that an antenna gain for the beam #3 1320*c* and an antenna gain for the beam #4 1320*d* are low (failing to satisfy the antenna gain threshold). Thus, the beam #3 1320*c* and the beam #4 1320*d* are not narrow beams. Accordingly, if the wireless communication device uses the beam #1 1320*a* or the beam #2 1320*b* for transmission, the wireless communication device may transmit without performing an LBT. If, however, the wireless communication device uses the beam #3 1320*c* or the beam #4 1320*d* for transmission, the wireless communication device may perform an LBT and may proceed with the transmission upon an LBT pass.

While FIG. 13 illustrates the UE 215 utilizing a single primary channel access condition in each of the first scenario and second scenario, aspects are not limited there to. To that end, the UE 215 may utilize various combinations of channel access conditions, for example, similar to the schemes 700, 810, 820, 830, 840, 850, 860, 900, 1000, 1100, and 1200 discussed above with reference to FIGS. 7, 8A, 8B, 8C, 8D, 8E, 9, 10, 11, and 12, respectively, for each beam 1320. Moreover, the long-term sensing-based channel access condition scenario (Table 1330) and the narrow beam-based channel access condition (Table 1340) shown in FIG. 13 are exemplary and not limiting.

Figure 14:
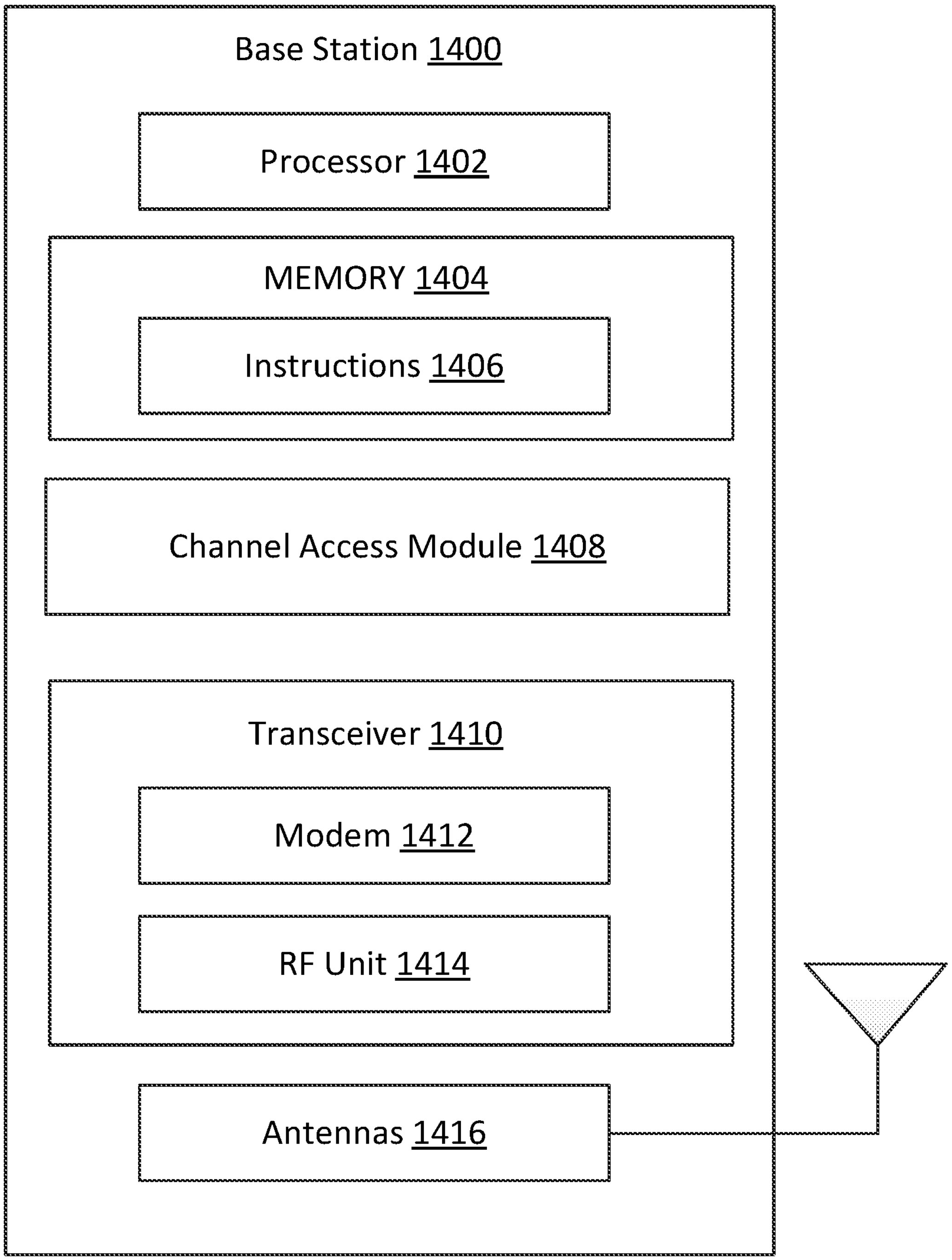
FIG. 14 illustrates a block diagram of a base station (BS) according to some aspects of the present disclosure.

FIG. 14 is a block diagram of an exemplary BS 1400 according to some aspects of the present disclosure. The BS 1400 may be a BS 145 as discussed in FIGS. 1-7, 8A-8F, and 9-13. As shown, the BS 1400 may include a processor 1402, a memory 1404, a channel access module 1408, a transceiver 1410 including a modem subsystem 1412 and a RF unit 1414, and one or more antennas 1416. These elements may be coupled with one another. The term "coupled" may refer to directly or indirectly coupled or connected to one or more intervening elements. For instance, these elements may be in direct or indirect communication with each other, for example via one or more buses.

The processor 1402 may have various features as a specific-type processor. For example, these may include a CPU, a DSP, an ASIC, a controller, a FPGA device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1404 may include a non-transitory computer-readable medium. The memory 1404 may store instructions 1406. The instructions 1406 may include instructions that, when executed by the processor 1402, cause the processor 1402 to perform operations described herein, for example, aspects of FIGS. 1-7, 8A-8F, 9-13, and 16. Instructions 1406 may also be referred to as program code. The program code may be for causing a wireless communication device to perform these operations, for example by causing one or more processors (such as processor 1402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The channel access module 1408 may be implemented via hardware, software, or combinations thereof. For example, the channel access module 1408 may be implemented as a processor, circuit, and/or instructions 1406 stored in the memory 1404 and executed by the processor 1402. In some examples, the channel access module 1408 can be integrated within the modem subsystem 1412. For example, the channel access module 1408 can be implemented by a combination of software components (e.g., executed by a DSP or a general processor) and hardware components (e.g., logic gates and circuitry) within the modem subsystem 1412. The channel access module 1408 may communicate with one or more components of BS 1400 to implement various aspects of the present disclosure, for example, aspects of FIGS. 1-7, 8A-8F, 9-13, and 16.

In some aspects, the channel access module 1408 is configured to determine a channel access procedure based on whether one or more channel access conditions are satisfied for accessing an unlicensed frequency band. The one or more channel access conditions are associated with at least one of sensing across multiple channel occupancy times (COTs), a transmission beam characteristic, a transmit power, a transmission duty cycle, or a beam dwell time. Further, the channel access module 1408 is configured to transmit, based on the channel access procedure, a communication signal in the unlicensed frequency band.

In some aspects, the channel access module 1508 is configured to determine whether the one or more channel access condition are satisfied for accessing the unlicensed frequency band. The one or more channel access conditions include multi-levels channel access conditions according to a channel access condition hierarchy. For instance, the one or more channel access conditions may include one or more primary channel access conditions at a first level, one or more secondary channel access condition at a second level, one or more tertiary channel access condition at a third level, and so on, for example, as discussed above with reference to FIGS. 4-7, 8A-8F, and 9-13. For instance, the channel access module 1508 is configured to determine whether a first channel access condition (e.g., a primary channel access condition 422, 602, 812, 822, 832, 842, 852, 862, 1002, 1202) of the one or more channel access conditions is satisfied. Further, in some aspects, the channel access module 1508 is configured to determine, in response to determining whether the first channel access condition is satisfied, whether a second channel access condition (e.g., a secondary channel access condition 424, 814, 824, 836, 844, 854, 864, 1204) of the one or more channel access conditions is satisfied. Further, in some aspects, the channel access module 1508 is configured to determine, in response to determining whether the second channel access condition is satisfied, whether a third channel access condition (e.g., a tertiary channel access condition 426, 1206) of the one or more channel access conditions is satisfied. In some aspects, the one or more channel access conditions are selected from channel access condition options such as the channel access condition options 410, 412, 414, 416, and 418 associated with performing long-term sensing, utilizing a narrow beam for transmission, restricting a transmit power, restricting a transmission duty cycle, and/or restricting a beam dwell time, respectively.

In some aspects, as part of determining the channel access procedure, the channel access module 1408 is configured to determine whether to perform an LBT, whether to perform long-term sensing, whether to utilize a narrow beam for transmission, whether to restrict a transmit power, whether to restrict a transmission duty cycle, and/or whether to restrict a beam dwell time, respectively, for example, the channel access procedure options 460, 462, 464, 466, 468, and/or 470 respectively.

As shown, the transceiver 1410 may include the modem subsystem 1412 and the RF unit 1414. The transceiver 1410 can be configured to communicate bi-directionally with other devices, such as the UEs 115 and/or BS 1400 and/or another core network element. The modem subsystem 1412 may be configured to modulate and/or encode data according to a MCS, e.g., a LDPC coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., RRC configurations, MIB, SIB, PDSCH data and/or PDCCH DCIs, etc.) from the modem subsystem 1412 (on outbound transmissions) or of transmissions originating from another source such as a UE 115, 215, and/or UE 1500. The RF unit 1414 may be further configured to perform analog beamforming in conjunction with the digital beamforming. Although shown as integrated together in transceiver 1410, the modem subsystem 1412 and/or the RF unit 1414 may be separate devices that are coupled together at the BS 1400 to enable the BS 1400 to communicate with other devices.

The RF unit 1414 may provide the modulated and/or processed data, e.g. data packets (or, more generally, data messages that may contain one or more data packets and other information), to the antennas 1416 for transmission to one or more other devices. The antennas 1416 may further receive data messages transmitted from other devices and provide the received data messages for processing and/or demodulation at the transceiver 1410. The transceiver 1410 may provide the demodulated and decoded data (e.g., PUSCH data, PUCCH UCI, MSG1, MSG3, etc.) to the channel access module 1408 for processing. The antennas 1416 may include multiple antennas of similar or different designs in order to sustain multiple transmission links.

In an aspect, the BS 1400 can include multiple transceivers 1410 implementing different RATs (e.g., NR and LTE). In an aspect, the BS 1400 can include a single transceiver 1410 implementing multiple RATs (e.g., NR and LTE). In an aspect, the transceiver 1410 can include various components, where different combinations of components can implement different RATs.

Further, in some aspects, the processor 1402 is coupled to the transceiver 1410. The processor 1402 is configured to determine a channel access procedure based on whether one or more channel access conditions are satisfied for accessing an unlicensed frequency band. The one or more channel access conditions are associated with at least one of sensing across multiple channel occupancy times (COTs), a transmission beam characteristic, a transmit power, a transmission duty cycle, or a beam dwell time. The transceiver 1410 is configured to transmit, based on the channel access procedure, a communication signal in the unlicensed frequency band.

Figure 15:
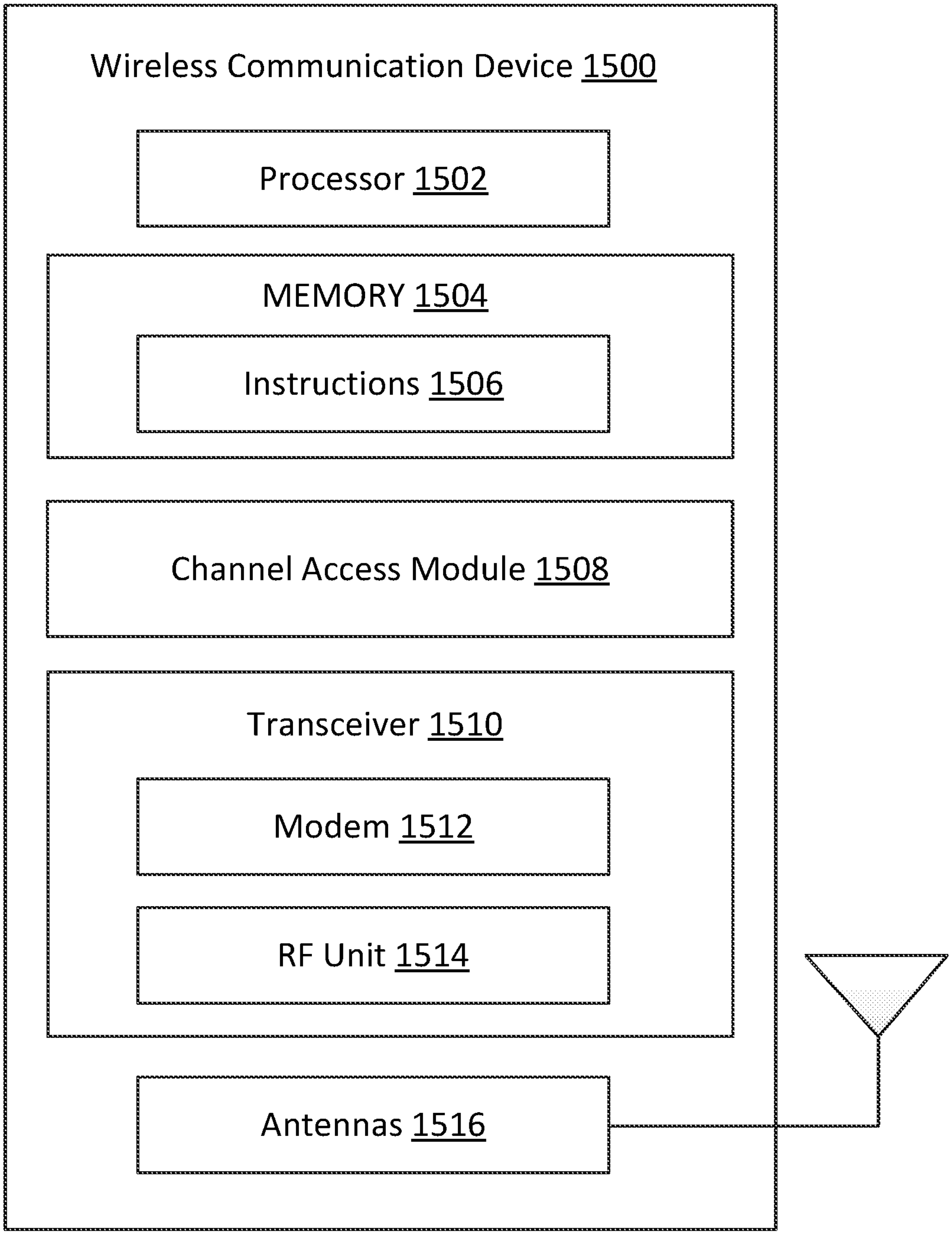
FIG. 15 illustrates a block diagram of a user equipment (UE) according to some aspects of the present disclosure.

FIG. 15 is a block diagram of an exemplary UE 1500 according to some aspects of the present disclosure. The UE 1500 may be a UE 115 as discussed above in FIGS. 1-7, 8A-8F, and 9-13. As shown, the UE 1500 may include a processor 1502, a memory 1504, a channel access module 1508, a transceiver 1510 including a modem subsystem 1512 and a radio frequency (RF) unit 1514, and one or more antennas 1516. These elements may be coupled with one another. The term "coupled" may refer to directly or indirectly coupled or connected to one or more intervening elements. For instance, these elements may be in direct or indirect communication with each other, for example via one or more buses.

The processor 1502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1502 may also be implemented as a combination of computing devices, e.g., a combination of a DSP and a microprocessor, a plurality of microprocessors, one or more microprocessors in conjunction with a DSP core, or any other such configuration.

The memory 1504 may include a cache memory (e.g., a cache memory of the processor 1502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1504 includes a non-transitory computer-readable medium. The memory 1504 may store, or have recorded thereon, instructions 1506. The instructions 1506 may include instructions that, when executed by the processor 1502, cause the processor 1502 to perform the operations described herein with reference to a UE 115 or an anchor in connection with aspects of the present disclosure, for example, aspects of FIGS. 1-7, 8A-8F, 9-13, and 16. Instructions 1506 may also be referred to as code, which may be interpreted broadly to include any type of computer-readable statement(s) as discussed above with respect to FIG. 14.

The channel access module 1508 may be implemented via hardware, software, or combinations thereof. For example, the channel access module 1508 may be implemented as a processor, circuit, and/or instructions 1506 stored in the memory 1504 and executed by the processor 1502. In some aspects, the channel access module 1508 can be integrated within the modem subsystem 1512. For example, the channel access module 1508 can be implemented by a combination of software components (e.g., executed by a DSP or a general processor) and hardware components (e.g., logic gates and circuitry) within the modem subsystem 1512. The channel access module 1508 may communicate with one or more components of UE 1500 to implement various aspects of the present disclosure, for example, aspects of FIGS. 1-7, 8A-8F, 9-13, and 16.

In some aspects, the channel access module 1508 is configured to determine a channel access procedure based on whether one or more channel access conditions are satisfied for accessing an unlicensed frequency band. The one or more channel access conditions are associated with at least one of sensing across multiple channel occupancy times (COTs), a transmission beam characteristic, a transmit power, a transmission duty cycle, or a beam dwell time. Further, the channel access module 1508 is configured to transmit, based on the channel access procedure, a communication signal in the unlicensed frequency band.

In some aspects, the channel access module 1508 is configured to determine whether the one or more channel access condition are satisfied for accessing the unlicensed frequency band. The one or more channel access conditions include multi-levels channel access conditions according to a channel access condition hierarchy. For instance, the one or more channel access conditions may include one or more primary channel access conditions at a first level, one or more secondary channel access condition at a second level, one or more tertiary channel access condition at a third level, and so on, for example, as discussed above with reference to FIGS. 4-7, 8A-8F, and 9-13. For instance, the channel access module 1508 is configured to determine whether a first channel access condition (e.g., a primary channel access condition) of the one or more channel access conditions is satisfied. Further, in some aspects, the channel access module 1508 is configured to determine, in response to determining whether the first channel access condition is satisfied, whether a second channel access condition (e.g., a secondary channel access condition) of the one or more channel access conditions is satisfied. Further, in some aspects, the channel access module 1508 is configured to determine, in response to determining whether the second channel access condition is satisfied, whether a third channel access condition (e.g., a tertiary channel access condition) of the one or more channel access conditions is satisfied. In some aspects, the one or more channel access conditions are selected from channel access condition options such as the channel access condition options 410, 412, 414, 416, and 418 associated with performing long-term sensing, utilizing a narrow beam for transmission, restricting a transmit power, restricting a transmission duty cycle, and/or restricting abeam dwell time, respectively.

In some aspects, as part of determining the channel access procedure, the channel access module 1508 is configured to determine whether to perform an LBT, whether to perform long-term sensing, whether to utilize a narrow beam for transmission, whether to restrict a transmit power, whether to restrict a transmission duty cycle, and/or whether to restrict a beam dwell time, respectively, for example, for example, the channel access procedure options 460, 462, 464, 466, 468, 470, and/or 472, respectively.

As shown, the transceiver 1510 may include the modem subsystem 1512 and the RF unit 1514. The transceiver 1510 can be configured to communicate bi-directionally with other devices, such as the BSs 105 and 1400. The modem subsystem 1512 may be configured to modulate and/or encode the data from the memory 1504 and/or the channel access module 1508 according to a modulation and coding scheme (MCS), e.g., a low-density parity check (LDPC) coding scheme, a turbo coding scheme, a convolutional coding scheme, a digital beamforming scheme, etc. The RF unit 1514 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 1514 may be further configured to perform analog beamforming in conjunction with the digital beamforming. Although shown as integrated together in transceiver 1510, the modem subsystem 1512 and the RF unit 1514 may be separate devices that are coupled together at the UE 1500 to enable the UE 1500 to communicate with other devices.

The RF unit 1514 may provide the modulated and/or processed data, e.g. data packets (or, more generally, data messages that may contain one or more data packets and other information), to the antennas 1516 for transmission to one or more other devices. The antennas 1516 may further receive data messages transmitted from other devices. The antennas 1516 may provide the received data messages for processing and/or demodulation at the transceiver 1510. The transceiver 1510 may provide the demodulated and decoded data (e.g., RRC configurations, MIB, SIB, PDSCH data and/or PDCCH DCIs, etc.) to the channel access module 1508 for processing. The antennas 1516 may include multiple antennas of similar or different designs in order to sustain multiple transmission links.

In an aspect, the UE 1500 can include multiple transceivers 1510 implementing different RATs (e.g., NR and LTE). In an aspect, the UE 1500 can include a single transceiver 1510 implementing multiple RATs (e.g., NR and LTE). In an aspect, the transceiver 1510 can include various components, where different combinations of components can implement different RATs.

Further, in some aspects, the processor 1502 is coupled to the transceiver 1510. The processor 1502 is configured to determine a channel access procedure based on whether one or more channel access conditions are satisfied for accessing an unlicensed frequency band. The one or more channel access conditions are associated with at least one of sensing across multiple channel occupancy times (COTs), a transmission beam characteristic, a transmit power, a transmission duty cycle, or a beam dwell time. The transceiver 1510 is configured to transmit, based on the channel access procedure, a communication signal in the unlicensed frequency band.

Figure 16:
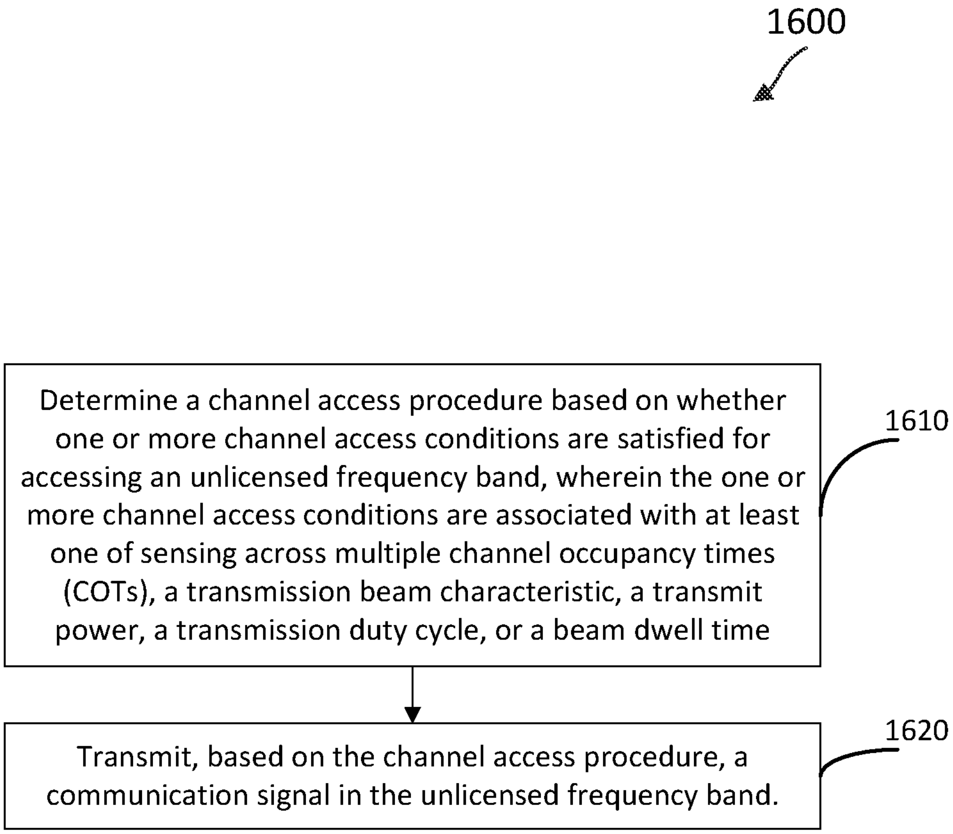
FIG. 16 is a flow diagram of a wireless communication method according to some aspects of the present disclosure.

FIG. 16 is a flow diagram illustrating a wireless communication method 1600 according to some aspects of the present disclosure. Aspects of the method 1600 can be executed by a computing device (e.g., a processor, processing circuit, and/or other suitable component) of a wireless communication device or other suitable means for performing the blocks. In one aspect, a wireless communication device, such as a UE 115, 215, or 1500, may utilize one or more components, such as the processor 1502, the memory 1504, the channel access module 1508, the transceiver 1510, the modem 1512, the RF unit 1514, and the one or more antennas 1516, to execute the blocks of method 1600. In another aspect, a wireless communication device, such as a BS 105, 205, or 1400, may utilize one or more components, such as the processor 1402, the memory 1404, the channel access module 1408, the transceiver 1410, the modem 1412, the RF unit 1414, and the one or more antennas 1416, to execute the blocks of method 1600. The method 1600 may employ similar mechanisms as described in FIGS. 1-7, 8A-8F, and/or 9-13. As illustrated, the method 1600 includes a number of enumerated blocks, but aspects of the method 1600 may include additional blocks before, after, and in between the enumerated blocks. In some aspects, one or more of the enumerated blocks may be omitted or performed in a different order.

At block 1610, a wireless communication device (e.g., a BS 105, 205, or 1400, or a UE 115, 215, or 1500) determines a channel access procedure based on whether one or more channel access conditions are satisfied for accessing an unlicensed frequency band. The one or more channel access conditions are associated with at least one of sensing across multiple channel occupancy times (COTs), a transmission beam characteristic, a transmit power, a transmission duty cycle, or a beam dwell time. In some aspects, means for performing the functionality of block 1610 can, but not necessarily, include, for example, channel access module 1408, transceiver 1410, antennas 1416, processor 1402, and/or memory 1404 with reference to FIG. 14, or channel access module 1508, transceiver 1510, antennas 1516, processor 1502, and/or memory 1504 with reference to FIG. 15.

At block 1620, the wireless communication device transmits, based on the channel access procedure, a communication signal in the unlicensed frequency band. In some aspects, the wireless communication device may be a BS (e.g., the BS 105, 205, 1400), and the communication signal may include a PDSCH signal, a PDCCH signal, a PBCH signal, and/or a DL reference signal. In some aspects, the wireless communication device may be a UE (e.g., the UE 115, 215, 1500), and the communication signal may include a PUSCH signal, a PUCCH signal, and/or a UL reference signal. In some aspects, means for performing the functionality of block 1620 can, but not necessarily, include, for example, channel access module 1408, transceiver 1410, antennas 1416, processor 1402, and/or memory 1404 with reference to FIG. 14, or channel access module 1508, transceiver 1510, antennas 1516, processor 1502, and/or memory 1504 with reference to FIG. 15.

In some aspects, the wireless communication device further determines whether a first channel access condition of the one or more channel access conditions is satisfied. In some aspects, each of the first channel access condition, the second channel access condition, and the third channel access condition is associated with a different one of the at least one of the sensing across the multiple COTs, the transmission beam characteristic, the transmit power, the transmission duty cycle, or the beam dwell time. In some instances, the first channel access condition may correspond to a first-level primary channel access condition as discussed above with reference to FIGS. 4-7, 8A-8F, and/or 9-13. In some other instances, the first channel access condition may correspond to a second-level secondary channel access condition as discussed above with reference to FIGS. 4-7, 8A-8F, and/or 9-13. In some other instances, the first channel access condition may correspond to a third-level tertiary access condition as discussed above with reference to FIGS. 4-7, 8A-8F, and/or 9-13. In general, the first channel access condition may correspond to a channel access condition in any level of a hierarchical channel access condition framework discussed above. In some aspects, the wireless communication device further selects the first channel access condition from a plurality of channel access conditions for accessing the unlicensed frequency band. In some aspects, the wireless communication device selects the first channel access condition from the plurality of channel access conditions is based on a parameter. In some aspects, the parameter for selecting the first channel access condition from the plurality of channel access conditions is associated with a number of beams.

In some aspects, the wireless communication device further determines, in response to determining the first channel access condition is satisfied, whether a second channel access condition of the one or more channel access conditions for accessing the unlicensed frequency band is satisfied. For example, the first channel access condition may correspond to a primary channel access condition (e.g., the primary channel access condition 422, 602, 812, 822, 832, 842, 852, 862, 1002, or 1202) and the second channel access condition may correspond to a secondary channel access condition (e.g., the secondary channel access condition 424, 814, 824, 836, 844, 854, 864, 1204) discussed above in relation to FIGS. 7, 8A-8F, and 9-12. In some aspects, each of the first channel access condition and the second channel access condition is associated with a different one of the at least one of the sensing across the multiple COTs, the transmission beam characteristic, the transmit power, the transmission duty cycle, or the beam dwell time.

In some aspects, as part of determining whether the first channel access condition is satisfied, the wireless communication device determines whether a channel measurement associated with the sensing across the multiple COTs satisfies a threshold. Further, as part of determining whether the second channel access condition is satisfied, the wireless communication device determines whether a beam width associated with a transmission beam to be used for transmitting the communication signal satisfies a threshold.

In some aspects, as part of determining whether the first channel access condition is satisfied, the wireless communication device determines whether a channel measurement associated with the sensing across the multiple COTs satisfies a threshold. Further, as part of determining whether the second channel access condition is satisfied, the wireless communication device determines whether a transmit power to be used for transmitting the communication signal satisfies a threshold.

In some aspects, as part of determining whether the first channel access condition is satisfied, the wireless communication device determines whether a beam width associated with a transmission beam to be used for transmitting the communication signal satisfies a threshold. Further, as part of determining whether the second channel access condition is satisfied, the wireless communication device determines whether a channel measurement associated with the sensing across the multiple COTs satisfies a threshold.

In some aspects, the wireless communication device further determines, in response to determining the second channel access condition is satisfied, whether a third channel access condition of the one or more channel access conditions for accessing the unlicensed frequency band is satisfied. For example, the first channel access condition may correspond to a primary channel access condition (e.g., the primary channel access condition 422, 602, 812, 822, 832, 842, 852, 862, 1002, or 1202), the second channel access condition may correspond to a secondary channel access condition (e.g., the secondary channel access condition 424, 814, 824, 836, 844, 854, 864, 1204), and the third channel access condition may correspond to a tertiary channel access condition (e.g., the tertiary channel access condition (e.g., a tertiary channel access condition 426, 1206) discussed above in relation to FIGS. 7, 8A-8F, and 9-13. In some aspects, the third channel access condition comprises at least one of an energy threshold associated with the sensing across the multiple COTs, an antenna gain threshold, a difference threshold associated with a difference between a transmit power threshold and an equivalent isotropically radiated power (EIRP) threshold, a beam width threshold, a transmit power threshold, a transmission duty cycle threshold, or a beam dwell time threshold.

In some aspects, the wireless communication device further determines whether the one or more channel access conditions are satisfied. In some aspects, as part of determining whether the one or more channel access conditions are satisfied, the wireless communication device determines whether a channel measurement associated with the sensing across the multiple COTs satisfies a threshold. In some aspects, as part of determining whether the one or more channel access conditions are satisfied, the wireless communication device determines whether an antenna gain associated with a transmission beam to be used for transmitting the communication signal satisfies a threshold. In some aspects, as part of determining whether the one or more channel access conditions are satisfied, the wireless communication device determines whether a difference between a transmit power and an equivalent isotropically radiated power (EIRP) associated with a transmission beam to be used for transmitting the communication signal satisfies a threshold In some aspects, as part of determining whether the one or more channel access conditions are satisfied, the wireless communication device determines whether a beam width of a transmission beam to be used for transmitting the communication signal satisfies a threshold. In some aspects, as part of determining whether the one or more channel access conditions are satisfied, the wireless communication device determines whether a transmit power to be used for transmitting the communication signal satisfies a threshold. In some aspects, as part of determining whether the one or more channel access conditions are satisfied, the wireless communication device determines whether a beam dwell time associated with a transmission beam to be used for transmitting the communication signal satisfies a threshold. In some aspects, as part of determining whether the one or more channel access conditions are satisfied, the wireless communication device determines whether a transmission duty cycle to be used for transmitting the communication signal satisfies a threshold.

In some aspects, as part of determining the channel access procedure at block 1610, the wireless communication device determines to perform an LBT. Accordingly, the wireless communication device further performs, based on the channel access procedure, an LBT before transmitting the communication signal in the unlicensed frequency band.

In some aspects, as part of determining the channel access procedure at block 1610, the wireless communication device determines that the communication signal can be transmitted without performing an LBT. Accordingly, wireless communication device transmits the communication signal in the unlicensed frequency band at block 1620 without performing an LBT.

In some aspects, as part of determining the channel access procedure at block 1610, the wireless communication device determines that the communication signal is to be transmitted using a narrow beam. In one aspect, the wireless communication device may transmit the communication signal in the unlicensed frequency band at block 1620 based on an antenna gain threshold. For example, the wireless communication device may generate a narrow transmission beam by configuring its antenna (e.g., the antennas 1416 and 1516) with an antenna gain satisfying the antenna gain threshold (e.g., <X dB) and transmit the communication signal using the transmission beam. In another aspect, the wireless communication device may transmit the communication signal in the unlicensed frequency band at block 1620 based on a threshold associated with a difference between a transmit power and an equivalent isotropically radiated power (EIRP). For example, the wireless communication device may generate a narrow transmission beam by configuring its RF frontend (e.g., RF units 1414 and 1514) such that a difference between a transmit power and an EIRP satisfying the threshold (e.g., >Y dB) and transmit the communication signal using the transmission beam. In yet another aspect, the wireless communication device may transmit the communication signal in the unlicensed frequency band at block 1620 based on a beam width threshold. For example, the wireless communication device may configure its RF frontend (RF units 1414 and 1514) to generate a transmission beam with a beam width at a certain power level (e.g., a half-power beam width) satisfying the beam width threshold (e.g., <Z degrees) and transmit the communication signal using the transmission beam.

In some aspects, as part of determining the channel access procedure at block 1610, the wireless communication device determines to perform long-term sensing, for example, to assist determining a channel access mechanism for a subsequent transmission. Accordingly, the wireless communication device performing, based on the channel access procedure, sensing across multiple COTs, for example, as in scheme 300 discussed above with reference to FIG. 3.

In some aspects, as part of determining the channel access procedure at block 1610, the wireless communication device determines to apply a limitation to a beam dwell time (e.g., a duration of contiguous transmissions in a certain beam direction) for transmitting the communication signal at block 1620. Accordingly, wireless communication device transmits the communication signal in the unlicensed frequency band at block 1620 based on abeam dwell time threshold. For example, the wireless communication device may determine a transmission time (e.g., delaying a transmission time) or a duration (e.g., shortening a transmission duration, for example, using a higher MCS or truncating a data packet) for transmitting the communication signal in a certain beam direction such that the wireless communication device can maintain a beam dwell time that is below the beam dwell time threshold (e.g., with a maximum of T1 ms on-time and T2 ms off-time in a certain beam direction). Alternatively, the wireless communication device may select a next best beam direction that can satisfy the beam dwell time threshold for transmitting the communication signal. In other instances, the wireless communication device may not consider the beam dwell time threshold when transmitting the communication signal. For instance, the wireless communication device may transmit in a beam direction for longer than T1 ms and/or with shorter than T2 ms off-time.

In some aspects, as part of determining the channel access procedure at block 1610, the wireless communication device determines to apply a limitation to a transmission duty cycle for transmitting the communication signal at block 1620. Accordingly, wireless communication device transmits the communication signal in the unlicensed frequency band at block 1620 based on a duty cycle threshold. For example, the wireless communication device may determine a transmission time (e.g., delaying a transmission time) or a duration (e.g., shortening a transmission duration, for example, using a higher MCS or truncating a data packet) for transmitting the communication signal such that the wireless communication device can maintain a transmission duty cycle that is below the transmission duty cycle threshold (e.g., <D % of active time out of a total time). In other instances, the wireless communication device may not consider the transmission duty cycle threshold when transmitting the communication signal. For instance, the wireless communication device may transmit with a duty cycle greater than D % of active time out of a total time.

In some aspects, as part of determining the channel access procedure at block 1610, the wireless communication device determines to apply a limitation to a transmit power for transmitting the communication signal at block 1620. Accordingly, wireless communication device transmits the communication signal in the unlicensed frequency band at block 1620 based on a transmit power threshold. For example, the wireless communication device may configure its RF frontend (e.g., RF units 1414 and/or 1514) to output a transmit power (e.g., a conducted transmit power) that is less than the transmit power threshold (e.g., <P dBm) and transmit the communication signal using the transmit power.

In some aspects, as part of determining the channel access procedure at block 1610, the wireless communication device selects a threshold from at least one of a transmit power threshold, a transmission duty cycle threshold, or beam dwell time threshold, and transmits the communication signal in the unlicensed frequency band at block 1620 based on the selected threshold.

In some aspects, the wireless communication device further determines whether a first transmission beam satisfies a first channel access condition of the one or more channel access conditions and determines whether a second transmission beam different from the first transmission beam satisfies the first channel access condition. In some aspects, as part of transmitting the communication signal at block 1620, the wireless communication device transmits the communication signal using the first transmission beam after performing an LBT or transmit the communication signal using the second transmission beam without performing an LBT.

Further aspects of the present disclosure include the following:

1. A method of wireless communication performed by a wireless communication device, the method comprising:
   determining a channel access procedure based on whether one or more channel access conditions are satisfied for accessing an unlicensed frequency band, wherein the one or more channel access conditions are associated with at least one of sensing across multiple channel occupancy times (COTs), a transmission beam characteristic, a transmit power, a transmission duty cycle, or a beam dwell time; and
   transmitting, based on the channel access procedure, a communication signal in the unlicensed frequency band.
2. The method of aspect 1, further comprising:
   determining whether a first channel access condition of the one or more channel access conditions is satisfied.
3. The method of aspect 2, wherein the first channel access condition comprises at least one of an energy threshold associated with the sensing across the multiple COTs, an antenna gain threshold, a difference threshold associated with a difference between a transmit power threshold and an equivalent isotropically radiated power (EIRP) threshold, a beam width threshold, a transmit power threshold, a transmission duty cycle threshold, or a beam dwell time threshold.
4. The method of aspect 2, further comprising:
   selecting the first channel access condition from a plurality of channel access conditions for accessing the unlicensed frequency band.
5. The method of aspect 4, wherein the selecting the first channel access condition from the plurality of channel access conditions is based on a parameter.
6. The method of aspect 5, wherein the parameter for selecting the first channel access condition from the plurality of channel access conditions is associated with a number of beams.
7. The method of any of aspects 1-6, further comprising:
   determining, in response to determining the first channel access condition is satisfied, whether a second channel access condition of the one or more channel access conditions for accessing the unlicensed frequency band is satisfied.
8. The method of aspect 7, wherein each of the first channel access condition and the second channel access condition is associated with a different one of the at least one of the sensing across the multiple COTs, the transmission beam characteristic, the transmit power, the transmission duty cycle, or the beam dwell time.
9. The method of aspect 7, wherein:
   the determining whether the first channel access condition is satisfied comprises:
      determining whether a channel measurement associated with the sensing across the multiple COTs satisfies a threshold; and
   the determining whether the second channel access condition is satisfied comprises:
      determining whether a beam width associated with a transmission beam to be used for transmitting the communication signal satisfies a threshold.
10. The method of aspect 7, wherein:
   the determining whether the first channel access condition is satisfied comprises:
      determining whether a channel measurement associated with the sensing across the multiple COTs satisfies a threshold; and
   the determining whether the second channel access condition is satisfied comprises:
      determining whether a transmit power to be used for transmitting the communication signal satisfies a threshold.
11. The method of aspect 7, wherein:
   the determining whether the first channel access condition is satisfied comprises:
      determining whether a beam width associated with a transmission beam to be used for transmitting the communication signal satisfies a threshold; and
   the determining whether the second channel access condition is satisfied comprises:
      determining whether a channel measurement associated with the sensing across the multiple COTs satisfies a threshold.
12. The method of aspect 7, further comprising:
   determining, in response to determining the second channel access condition is satisfied, whether a third channel access condition of the one or more channel access conditions for accessing the unlicensed frequency band is satisfied.
13. The method of aspect 12, wherein each of the first channel access condition, the second channel access condition, and the third channel access condition is associated with a different one of the at least one of the sensing across the multiple COTs, the transmission beam characteristic, the transmit power, the transmission duty cycle, or the beam dwell time.
14. The method any of aspects 1-6, further comprising:
   determining, in response to determining the first channel access condition is not satisfied, whether a second channel access condition of the one or more channel access conditions for accessing the unlicensed frequency band is satisfied.
15. The method of aspect 14, wherein:
   the determining whether the first channel access condition is satisfied comprises:
      determining whether a channel measurement associated with the sensing across the multiple COTs satisfies a threshold; and the determining whether the second channel access condition is satisfied comprises:
determining whether a transmit power to be used for transmitting the communication signal satisfies a threshold.

16. The method of any of aspects 1-15, further comprising:
determining whether the one or more channel access conditions are satisfied, wherein the determining whether the one or more channel access conditions are satisfied comprises determining whether a channel measurement associated with the sensing across the multiple COTs satisfies a threshold.

17. The method of any of aspects 1-15, further comprising:
determining whether the one or more channel access conditions are satisfied, wherein the determining whether the one or more channel access conditions are satisfied comprises determining whether an antenna gain associated with a transmission beam to be used for transmitting the communication signal satisfies a threshold.

18. The method of any of aspects 1-17, further comprising:
determining whether the one or more channel access conditions are satisfied, wherein the determining whether the one or more channel access conditions are satisfied comprises determining whether a difference between a transmit power and an equivalent isotropically radiated power (EIRP) associated with a transmission beam to be used for transmitting the communication signal satisfies a threshold.

19. The method any of aspects 1-18, further comprising:
determining whether the one or more channel access conditions are satisfied, wherein the determining whether the one or more channel access conditions are satisfied comprises determining whether a beam width of a transmission beam to be used for transmitting the communication signal satisfies a threshold.

20. The method of aspect any of aspects 1-19, further comprising:
determining whether the one or more channel access conditions are satisfied, wherein the determining whether the one or more channel access conditions are satisfied comprises determining whether a transmit power to be used for transmitting the communication signal satisfies a threshold.

21. The method of any of aspects 1-20, further comprising:
determining whether the one or more channel access conditions are satisfied, wherein the determining whether the one or more channel access conditions are satisfied comprises determining whether a beam dwell time associated with a transmission beam to be used for transmitting the communication signal satisfies a threshold.

22. The method of aspect any of aspects 1-21, further comprising:
determining whether the one or more channel access conditions are satisfied, wherein the determining whether the one or more channel access conditions are satisfied comprises determining whether a transmission duty cycle to be used for transmitting the communication signal satisfies a threshold.

23. The method of any of aspects 1-22, further comprising:
performing, based on the channel access procedure, a listen-before-talk (LBT) before transmitting the communication signal in the unlicensed frequency band.

24. The method of any of aspects 1-22, wherein the transmitting the communication signal comprises:
transmitting the communication signal in the unlicensed frequency band without performing a listen-before-talk (LBT).

25. The method of any of aspects 1-24, wherein the transmitting the communication signal comprises:
transmitting, based on an antenna gain threshold, the communication signal in the unlicensed frequency band.

26. The method of any of aspects 1-25, wherein the transmitting the communication signal comprises:
transmitting, based on a threshold associated with a difference between a transmit power and an equivalent isotropically radiated power (EIRP), the communication signal in the unlicensed frequency band.

27. The method of any of aspects 1-26, wherein the transmitting the communication signal comprises:
transmitting, based on a beam width threshold, the communication signal in the unlicensed frequency band.

28. The method of any of aspects 1-27, further comprising:
performing, based on the channel access procedure, sensing across multiple COTs.

29. The method of any of aspects 1-28, wherein the transmitting the communication signal comprises:
transmitting, based on a beam dwell time threshold, the communication signal in the unlicensed frequency band.

30. The method of any of aspects 1-29, wherein the transmitting the communication signal comprises:
transmitting, based on a duty cycle threshold, the communication signal in the unlicensed frequency band.

31. The method of any of aspects 1-30, wherein the transmitting the communication signal comprises:
transmitting, based on a transmit power threshold, the communication signal in the unlicensed frequency band.

32. The method of any of aspects 1-31, wherein:
the determining the channel access procedure comprises:
selecting a threshold from at least one of a transmit power threshold, a transmission duty cycle threshold, or beam dwell time threshold; and
the transmitting the communication signal comprises:
transmitting, based on the selected threshold, the communication signal.

33. The method of any of aspects 1-32, further comprising:
determining whether a first transmission beam satisfies a first channel access condition of the one or more channel access conditions; and
determining whether a second transmission beam different from the first transmission beam satisfies the first channel access condition.

34. The method of aspect 33, wherein the transmitting the communication signal comprises at least one of:
transmitting the communication signal using the first transmission beam after performing a listen-before-talk (LBT); or transmitting the communication signal using the second transmission beam without performing an LBT.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a wireless communication device, the method comprising:

performing, in association with one or more channel access conditions for accessing an unlicensed frequency band, at least one of sensing across multiple channel occupancy times (COTs), utilizing a transmission beam characteristic, restricting a transmit power, restricting a transmission duty cycle, or restricting a beam dwell time;

determining whether a first channel access condition of the one or more channel access conditions is satisfied;

determining, in response to determining the first channel access condition is satisfied, whether a second channel access condition of the one or more channel access conditions for accessing the unlicensed frequency band is satisfied;

determining, in response to determining the second channel access condition is satisfied, whether a third channel access condition of the one or more channel access conditions for accessing the unlicensed frequency band is satisfied, wherein each of the first channel access condition, the second channel access condition, and the third channel access condition is associated with a different one of the at least one of the sensing across the multiple COTs, the transmission beam characteristic, the transmit power, the transmission duty cycle, or the beam dwell time;

performing, based on whether the one or more channel access conditions are satisfied, a channel access procedure of a list of channel access procedures; and transmitting, based on the channel access procedure, a communication signal in the unlicensed frequency band.

2. The method of claim 1, wherein the first channel access condition comprises at least one of an energy threshold associated with the sensing across the multiple COTs, an antenna gain threshold, a difference threshold associated with a difference between a transmit power threshold and an equivalent isotropically radiated power (EIRP) threshold, a beam width threshold, a transmit power threshold, a transmission duty cycle threshold, or a beam dwell time threshold.

3. The method of claim 1, further comprising:

selecting the first channel access condition from a plurality of channel access conditions for accessing the unlicensed frequency band, wherein the selecting the first channel access condition from the plurality of channel access conditions is based on a parameter associated with a number of beams.

4. The method of claim 1, wherein each of the first channel access condition and the second channel access condition is associated with a different one of the at least one of the sensing across the multiple COTs, the transmission beam characteristic, the transmit power, the transmission duty cycle, or the beam dwell time.

5. The method of claim 1, wherein:

the determining whether the first channel access condition is satisfied comprises:

determining whether a channel measurement associated with the sensing across the multiple COTs satisfies a threshold; and the determining whether the second channel access condition is satisfied comprises:

determining whether a beam width associated with a transmission beam to be used for transmitting the communication signal satisfies a first threshold or a transmit power to be used for transmitting the communication signal satisfies a second threshold.

6. The method of claim 1, wherein:

the determining whether the first channel access condition is satisfied comprises:

determining whether a beam width associated with a transmission beam to be used for transmitting the communication signal satisfies a threshold; and the determining whether the second channel access condition is satisfied comprises:

determining whether a channel measurement associated with the sensing across the multiple COTs satisfies a threshold.

7. The method of claim 1, further comprising:

determining whether the one or more channel access conditions are satisfied, wherein the determining whether the one or more channel access conditions are satisfied comprises at least one of:

determining whether a channel measurement associated with the sensing across the multiple COTs satisfies a first threshold;

determining whether an antenna gain associated with a transmission beam to be used for transmitting the communication signal satisfies a second threshold;

determining whether a difference between a transmit power and an equivalent isotropically radiated power (EIRP) associated with a transmission beam to be used for transmitting the communication signal satisfies a third threshold;

determining whether a beam width of a transmission beam to be used for transmitting the communication signal satisfies a fourth threshold;

determining whether a transmit power to be used for transmitting the communication signal satisfies a fifth threshold;

determining whether a beam dwell time associated with a transmission beam to be used for transmitting the communication signal satisfies a sixth threshold; or determining whether a transmission duty cycle to be used for transmitting the communication signal satisfies a seventh threshold.

8. The method of claim 1, further comprising:

performing, based on the channel access procedure, a listen-before-talk (LBT) before transmitting the communication signal in the unlicensed frequency band.

9. The method of claim 1, wherein the transmitting the communication signal comprises at least one of:

transmitting the communication signal in the unlicensed frequency band without performing a listen-before-talk (LBT);

transmitting, based on an antenna gain threshold, the communication signal in the unlicensed frequency band; or transmitting, based on a threshold associated with a difference between a transmit power and an equivalent isotropically radiated power (EIRP), the communication signal in the unlicensed frequency band.

10. The method of claim 1, wherein the transmitting the communication signal comprises:

transmitting the communication signal in the unlicensed frequency band based on at least one of:

a beam width threshold;

a beam dwell time threshold; a duty cycle threshold; or a transmit power threshold.

11. The method of claim 1, further comprising:

performing, based on the channel access procedure, sensing across multiple COTs.

12. The method of claim 1, wherein:

the determining the channel access procedure comprises:

selecting a threshold from at least one of a transmit power threshold, a transmission duty cycle threshold, or beam dwell time threshold; and the transmitting the communication signal comprises:

transmitting, based on the selected threshold, the communication signal.

13. The method of claim 1, further comprising:

determining whether a first transmission beam satisfies a first channel access condition of the one or more channel access conditions; and determining whether a second transmission beam different from the first transmission beam satisfies the first channel access condition, wherein the transmitting the communication signal comprises at least one of:

transmitting the communication signal using the first transmission beam after performing a listen-before-talk (LBT); or transmitting the communication signal using the second transmission beam without performing an LBT.

14. A wireless communication device comprising:

one or more memories;

a transceiver; and at least one processor coupled to the one or more memories and the transceiver, wherein the at least one processor is further configured to:

perform, in association with one or more channel access conditions for accessing an unlicensed frequency band, at least one of sensing across multiple channel occupancy times (COTs), utilizing a transmission beam characteristic, restricting a transmit power, restricting a transmission duty cycle, or restricting a beam dwell time;

determine whether a first channel access condition of the one or more channel access conditions is satisfied;

determine, in response to determination that the first channel access condition is satisfied, whether a second channel access condition of the one or more channel access conditions for accessing the unlicensed frequency band is satisfied;

determine, in response to determination that the second channel access condition is satisfied, whether a third channel access condition of the one or more channel access conditions for accessing the unlicensed frequency band is satisfied, wherein each of the first channel access condition, the second channel access condition, and the third channel access condition is associated with a different one of the at least one of the sensing across the multiple COTs, the transmission beam characteristic, the transmit power, the transmission duty cycle, or the beam dwell time;

perform, based on whether the one or more channel access conditions are satisfied, a channel access procedure of a list of channel access procedures; and transmit, via the transceiver, based on the channel access procedure, a communication signal in the unlicensed frequency band.

15. The wireless communication device of claim 14, wherein the first channel access condition comprises at least one of an energy threshold associated with the sensing across the multiple COTs, an antenna gain threshold, a difference threshold associated with a difference between a transmit power threshold and an equivalent isotropically radiated power (EIRP) threshold, a beam width threshold, a transmit power threshold, a transmission duty cycle threshold, or a beam dwell time threshold.

16. The wireless communication device of claim 14, wherein the at least one processor is further configured to:

select the first channel access condition from a plurality of channel access conditions for accessing the unlicensed frequency band, wherein the at least one processor configured to select the first channel access condition is configured to select the first channel access condition from the plurality of channel access conditions is based on a parameter.

17. The wireless communication device of claim 16, wherein the parameter for selecting the first channel access condition from the plurality of channel access conditions is associated with a number of beams.

18. The wireless communication device of claim 14, wherein each of the first channel access condition and the second channel access condition is associated with a different one of the at least one of the sensing across the multiple COTs, the transmission beam characteristic, the transmit power, the transmission duty cycle, or the beam dwell time.

19. The wireless communication device of claim 14, wherein:

the at least one processor configured to determine whether the first channel access condition is satisfied is further configured to:

determine whether a channel measurement associated with the sensing across the multiple COTs satisfies a threshold; and the at least one processor configured to determine whether the second channel access condition is satisfied is configured to:

determine whether a beam width associated with a transmission beam to be used for transmitting the communication signal satisfies a first threshold or a transmit power to be used for transmitting the communication signal satisfies a second threshold.

20. The wireless communication device of claim 14, wherein:

the at least one processor configured to determine whether the first channel access condition is satisfied is further configured to:

determine whether a beam width associated with a transmission beam to be used for transmitting the communication signal satisfies a threshold; and the at least one processor configured to determine whether the second channel access condition is satisfied is further configured to:

determine whether a channel measurement associated with the sensing across the multiple COTs satisfies a threshold.

21. The wireless communication device of claim 14, wherein:

the at least one processor configured to determine whether the first channel access condition is satisfied is further configured to:

determine whether a channel measurement associated with the sensing across the multiple COTs satisfies a threshold; and the at least one processor configured to determine whether the second channel access condition is satisfied is further configured to:

determine whether a transmit power to be used for transmitting the communication signal satisfies a threshold.

22. The wireless communication device of claim 14, wherein the at least one processor configured is further configured to:

determine whether the one or more channel access conditions are satisfied, wherein the determining whether the one or more channel access conditions are satisfied comprises at least one of:

determining whether a channel measurement associated with the sensing across the multiple COTs satisfies a first threshold;

determining whether an antenna gain associated with a transmission beam to be used for transmitting the communication signal satisfies a second threshold;

determining whether a difference between a transmit power and an equivalent isotropically radiated power (EIRP) associated with a transmission beam to be used for transmitting the communication signal satisfies a third threshold;

determining whether a beam width of a transmission beam to be used for transmitting the communication signal satisfies a fourth threshold;

determining whether a transmit power to be used for transmitting the communication signal satisfies a fifth threshold;

determining whether a beam dwell time associated with a transmission beam to be used for transmitting the communication signal satisfies a sixth threshold; or determining whether a transmission duty cycle to be used for transmitting the communication signal satisfies a seventh threshold.

23. The wireless communication device of claim 14, wherein the at least one processor configured is further configured to:

perform, based on the channel access procedure, a listen-before-talk (LBT) before transmitting the communication signal in the unlicensed frequency band.

24. The wireless communication device of claim 14, wherein the at least one processor configured to transmit the communication signal is configured to at least one of:

transmit the communication signal in the unlicensed frequency band without performing a listen-before-talk (LBT);

transmit, based on an antenna gain threshold, the communication signal in the unlicensed frequency band; or transmit, based on a threshold associated with a difference between a transmit power and an equivalent isotropically radiated power (EIRP), the communication signal in the unlicensed frequency band.

25. The wireless communication device of claim 14, wherein the at least one processor configured to transmit the communication signal is configured to:

transmit, the communication signal in the unlicensed frequency band based on at least one of:

a beam width threshold;

a beam dwell time threshold; a duty cycle threshold; or a transmit power threshold.

26. The wireless communication device of claim 14, wherein:

the at least one processor configured to determine the channel access procedure is further configured to:

select a threshold from at least one of a transmit power threshold, a transmission duty cycle threshold, or beam dwell time threshold; and the at least one processor configured to transmit the communication signal is further configured to:

transmit, based on the selected threshold, the communication signal.

27. The wireless communication device of claim 14, wherein the at least one processor is further configured to:

determine whether a first transmission beam satisfies a first channel access condition of the one or more channel access conditions; and determine whether a second transmission beam different from the first transmission beam satisfies the first channel access condition.

* * * * *